United States Patent
Park et al.

(10) Patent No.: US 11,284,059 B2
(45) Date of Patent: *Mar. 22, 2022

(54) METHOD AND APPARATUS FOR CALIBRATING PARAMETER OF THREE-DIMENSIONAL (3D) DISPLAY APPARATUS

(71) Applicant: SAMSUNG ELECTRONICS CO., LTD., Suwon-si (KR)

(72) Inventors: Juyong Park, Seongnam-si (KR); Hyoseok Hwang, Suwon-si (KR); Dongkyung Nam, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/910,985

(22) Filed: Jun. 24, 2020

(65) Prior Publication Data

US 2020/0322593 A1 Oct. 8, 2020

Related U.S. Application Data

(63) Continuation of application No. 15/987,250, filed on May 23, 2018, now Pat. No. 10,721,462.

(30) Foreign Application Priority Data

Oct. 27, 2017 (KR) .................. 10-2017-0141362

(51) Int. Cl.
*H04N 13/32* (2018.01)
*H04N 13/327* (2018.01)
(Continued)

(52) U.S. Cl.
CPC ......... *H04N 13/327* (2018.05); *G06T 3/0093* (2013.01); *G06T 7/70* (2017.01);
(Continued)

(58) Field of Classification Search
CPC .. H04N 13/305; H04N 13/317; H04N 13/327; H04N 13/31; H04N 13/106; G06T 2207/30168; G06T 3/0093
See application file for complete search history.

(56) References Cited

U.S. PATENT DOCUMENTS 6,008,484 A * 12/1999 Woodgate ............ H04N 13/376
250/201.1
8,368,690 B1 * 2/2013 Hoppenstein ........ H04N 13/327
345/419
(Continued)

FOREIGN PATENT DOCUMENTS

CN 105704480 A 6/2016
CN 106488210 A 3/2017
(Continued)

OTHER PUBLICATIONS

Communication dated Mar. 8, 2021 issued by the State Intellectual Property Office of the P.R.China in application No. 201810587155.8.
(Continued)

*Primary Examiner* — Jefferey F Harold
*Assistant Examiner* — Timothy R Newlin
(74) *Attorney, Agent, or Firm* — Sughrue Mion, PLLC

(57) ABSTRACT

Disclosed is a method and apparatus for calibrating parameters of a three-dimensional (3D) display apparatus, the method including acquiring a first captured image of a 3D display apparatus displaying a first pattern image, adjusting a first parameter set of the 3D display apparatus based on the first captured image, acquiring a second captured image of the 3D display apparatus displaying a second pattern image based on the adjusted first parameter set, and adjusting a second parameter set of the 3D display apparatus based on the second captured image.

14 Claims, 17 Drawing Sheets

(51) Int. Cl.
  *H04N 13/305* (2018.01)
  *H04N 13/317* (2018.01)
  *H04N 13/31* (2018.01)
  *G06T 7/70* (2017.01)
  *H04N 13/125* (2018.01)
  *H04N 13/398* (2018.01)
  *G06T 3/00* (2006.01)
  *H04N 13/00* (2018.01)

(52) U.S. Cl.
  CPC ......... *H04N 13/125* (2018.05); *H04N 13/305* (2018.05); *H04N 13/31* (2018.05); *H04N 13/317* (2018.05); *H04N 13/398* (2018.05); *G06T 2207/30168* (2013.01); *H04N 2013/0096* (2013.01)

(56) References Cited

U.S. PATENT DOCUMENTS

| | | | |
|---|---|---|---|
| 8,520,060 B2 | 8/2013 | Zomet et al. | |
| 8,890,865 B2 | 11/2014 | Park et al. | |
| 9,019,354 B2 | 4/2015 | Grossmann | |
| 9,341,859 B2 | 5/2016 | Sumi et al. | |
| 2002/0122585 A1* | 9/2002 | Swift | H04N 13/359 382/154 |
| 2003/0076279 A1* | 4/2003 | Schkolnik | H04N 13/305 345/6 |
| 2005/0185711 A1* | 8/2005 | Pfister | H04N 19/44 375/240.01 |
| 2005/0219241 A1* | 10/2005 | Chun | H04N 13/363 345/419 |
| 2009/0141022 A1* | 6/2009 | Kimpe | H04N 13/324 345/419 |
| 2009/0141121 A1* | 6/2009 | Kimpe | H04N 13/327 348/51 |
| 2010/0225743 A1* | 9/2010 | Florencio | H04N 13/117 348/46 |
| 2011/0254916 A1* | 10/2011 | Fan | G03B 35/18 348/41 |
| 2012/0050487 A1* | 3/2012 | Masumura | G02B 30/27 348/46 |
| 2012/0154559 A1* | 6/2012 | Voss | H04N 13/327 348/55 |
| 2012/0287240 A1* | 11/2012 | Grossmann | G06T 7/80 348/46 |
| 2012/0300044 A1* | 11/2012 | Thomas | H04N 13/349 348/51 |
| 2013/0076877 A1* | 3/2013 | Hung | H04N 13/356 348/55 |
| 2013/0127842 A1 | 5/2013 | Lee et al. | |
| 2013/0182083 A1 | 7/2013 | Grossmann | |
| 2014/0333665 A1 | 11/2014 | Sylvan et al. | |
| 2015/0035993 A1* | 2/2015 | James | H04N 17/04 348/189 |
| 2015/0138326 A1* | 5/2015 | Park | H04N 13/133 348/51 |
| 2016/0150223 A1* | 5/2016 | Hwang | H04N 13/106 348/51 |
| 2016/0165217 A1* | 6/2016 | Kim | H04N 13/327 348/51 |
| 2016/0277728 A1* | 9/2016 | Guido | H04N 13/376 |
| 2016/0286206 A1* | 9/2016 | Yoshino | G02F 1/133345 |
| 2017/0041592 A1 | 2/2017 | Hwang et al. | |
| 2017/0054970 A1* | 2/2017 | Singh | H04N 13/327 |
| 2017/0171522 A1 | 6/2017 | Shields | |
| 2017/0366800 A1* | 12/2017 | Namboodiri | G02B 13/06 |
| 2018/0217664 A1* | 8/2018 | Yamada | A61B 5/11 |

FOREIGN PATENT DOCUMENTS

| | | |
|---|---|---|
| CN | 107155104 A | 9/2017 |
| CN | 107179613 A | 9/2017 |
| EP | 0 897 126 A2 | 2/1999 |
| JP | 2006-162666 A | 6/2006 |
| JP | 2010-39184 A | 2/2010 |
| JP | 2014529954 A | 11/2014 |
| JP | 2016100902 A | 5/2016 |
| KR | 10-2014-0027653 A | 3/2014 |
| KR | 10-2016-0107265 A | 9/2016 |

OTHER PUBLICATIONS

Communication dated Mar. 16, 2021 issued by the Japanese Patent Office in application No. 2018-193229.
Communication dated Feb. 27, 2019, issued by the European Patent Office in counterpart European Application No. 18183085.2.
Communication dated Jul. 28, 2021 issued by the European Patent Office in European Application No. 18163065.2.

* cited by examiner $$\tan\theta = \frac{P}{\text{Vertical pitch}}$$

METHOD AND APPARATUS FOR CALIBRATING PARAMETER OF THREE-DIMENSIONAL (3D) DISPLAY APPARATUS

CROSS-REFERENCE TO RELATED APPLICATION

This application is a continuation of U.S. patent application Ser. No. 15/987,250, filed May 23, 2018, in the U.S. Patent and Trademark Office, which claims the benefit of Korean Patent Application No. 10-2017-0141362, filed on Oct. 27, 2017, in the Korean Intellectual Property Office, the disclosures of which are incorporated herein by reference in their entireties.

BACKGROUND

1. Field

Methods and apparatuses consistent with exemplary embodiments relate to a method and apparatus for calibrating a parameter of a three-dimensional (3D) display apparatus.

2. Description of the Related Art

Among factors which play a part in the recognition of an image as a stereoscopic image, a dominant factor may be a difference in the images viewed by the left and right eyes of a user. A method of presenting different images to the user's left and right eyes may be a stereoscopic method or an autostereoscopic method. According to a stereoscopic method, an image may be filtered image based on, for example, polarization, time, or wavelength, using different wavelengths of primary colors. According to an autostereoscopic method, each image may be presented to be viewed from a predetermined viewpoint using a three-dimensional (3D) conversion apparatus, for example, a parallax barrier, lenticular lenses, or a directional backlight unit (BLU).

By using an autostereoscopic method, the inconvenience of wearing glasses may be reduced, and a 3D image may be accurately projected toward both eyes of the user while preventing crosstalk of the 3D image. However, image quality may be degraded when a 3D display apparatus and a 3D conversion apparatus are manufactured or installed incorrectly.

SUMMARY

One or more exemplary embodiments may address at least the above problems and/or disadvantages and other disadvantages not described above. Also, the exemplary embodiments are not required to overcome the disadvantages described above, and an exemplary embodiment may not overcome any of the problems described above.

According to an aspect of an exemplary embodiment, there is provided a calibration method including acquiring a first captured image of a three-dimensional (3D) display apparatus displaying a first pattern image, adjusting a first parameter set of the 3D display apparatus based on the first captured image, acquiring a second captured image of the 3D display apparatus displaying a second pattern image based on the adjusted first parameter set, and adjusting a second parameter set of the 3D display apparatus based on the second captured image.

The first pattern image may be generated based on first source images, each including a horizontal line and the second pattern image may be generated based on second source images, each including a vertical line. The first pattern image may be generated based on first source images corresponding to a plurality of viewpoints and the first source images may each include a horizontal line at a different position based on a corresponding viewpoint. The second pattern image may be generated based on second source images corresponding to a plurality of viewpoints and the second source images may each include a vertical line at a different position based on a corresponding viewpoint.

The calibration method may further include repeating the acquiring the first captured image and the adjusting the first parameter set, until a first condition is satisfied. The first condition may include a gradient of a linear pattern appearing in the first captured image being less than a first threshold and a reference line of the linear pattern being located within a first range.

The first parameter set may include a pitch parameter indicating a horizontal period of a unit element of a 3D conversion device in the 3D display apparatus, and when a linear pattern appearing in the first captured image includes a single line, the adjusting of the first parameter set may include measuring a gradient of the single line, adjusting the pitch parameter by a first value, and adjusting the pitch parameter by a second value based on a gradient change of the single line changing in response to the pitch parameter being adjusted by the first value. The first parameter set may include a pitch parameter indicating a horizontal period of a unit element of a 3D conversion device in the 3D display apparatus, and when a linear pattern appearing in the first captured image includes a plurality of lines, the adjusting of the first parameter set may include detecting a secondary linear pattern represented by the plurality of lines, determining an actual value of the pitch parameter based on a current value of the pitch parameter and a pitch of the secondary linear pattern, and adjusting the pitch parameter based on the determined actual value.

The first parameter set may include a start position parameter indicating a relative position between a 3D conversion device and a display panel in the 3D display apparatus, and the adjusting of the first parameter set may include measuring a position of a reference line of a linear pattern appearing in the first captured image, adjusting the start position parameter by a first value, and adjusting the start position parameter by a second value based on a positional change of the reference line changing in response to the start position parameter being adjusted by the first value.

The calibration method may further include repeating the acquiring the second captured image and the adjusting the second parameter set, until a second condition is satisfied. The second condition may include a gradient of a linear pattern appearing in the second captured image being less than a second threshold and a reference line of the linear pattern being located within a second range.

The second parameter set may include a slanted angle parameter indicating a gradient of a unit element of a 3D conversion device in the 3D display apparatus, and when a linear pattern appearing in the second captured image includes a single line, the adjusting of the second parameter set may include measuring a gradient of the single line, adjusting the slanted angle parameter by a first value, and adjusting the slanted angle parameter by a second value based on a gradient change of the single line changing in response to the slanted angle parameter being adjusted by the first value. The second parameter set may include a slanted angle parameter indicating a gradient of a unit element of a 3D conversion device in the 3D display apparatus, and when a linear pattern appearing in the second captured image includes a plurality of lines, the adjusting of the second parameter set may include detecting a secondary linear pattern represented by the plurality of lines, determining an actual value of the slanted angle parameter based on a current value of the slanted angle parameter and a pitch of the secondary linear pattern, and adjusting the slanted angle parameter based on the determined actual value. The adjusting of the slanted angle parameter may include adjusting the slanted angle parameter further based on a pitch parameter included in the adjusted first parameter set, the pitch parameter that indicates a horizontal period of the unit element of the 3D conversion device in the 3D display apparatus.

The calibration method may further include acquiring a third captured image of the 3D display apparatus displaying a warped image and determining a warping parameter for warping the first captured image and the second captured image based on the third captured image. The acquiring of the first captured image may include warping the first captured image based on the warping parameter and the acquiring of the second captured image may include warping the second captured image based on the warping parameter.

According to an aspect of another exemplary embodiment, there is also provided an operating method of a 3D display apparatus, the method including displaying a first pattern image, adjusting a first parameter set based on a first captured image of the 3D display apparatus displaying the first pattern image, displaying a second pattern image based on the adjusted first parameter set, and adjusting a second parameter set based on a second captured image of the 3D display apparatus displaying the second pattern image.

The operating method may further include receiving a first control signal that is generated based on the first captured image and the adjusting of the first parameter set may include adjusting the first parameter set based on the first control signal. The operating method may further include receiving a second control signal that is generated based on the second captured image and the adjusting of the second parameter set may include adjusting the second parameter set based on the second control signal.

The operating method may further include detecting a position of a camera that captures the first captured image and the second captured image and rendering the first pattern image and the second pattern image such that a reference view of a 3D image based on the first pattern image and a reference view of a 3D image based on the second pattern image correspond to the position of the camera.

According to an aspect of another exemplary embodiment, there is also provided a calibration apparatus including a processor and a memory including an instruction to be read by the processor, wherein when the instruction is executed in the processor, the processor is configured to acquire a first captured image of a 3D display apparatus displaying a first pattern image, adjust a first parameter set of the 3D display apparatus based on the first captured image, acquire a second captured image of the 3D display apparatus displaying a second pattern image based on the adjusted first parameter set, and adjust a second parameter set of the 3D display apparatus based on the second captured image.

According to an aspect of another exemplary embodiment, there is also provided a 3D display apparatus including a display panel, a processor, and a memory including an instruction to be read by the processor, wherein when the instruction is executed in the processor, the processor is configured to display a first pattern image on the display panel, adjust a first parameter set based on a first captured image of the 3D display apparatus while the first pattern image is displayed on the display panel, display a second pattern image on the display panel based on the adjusted first parameter set, and adjust a second parameter set based on a second captured image of the 3D display apparatus while the second pattern image is displayed on the display panel.

BRIEF DESCRIPTION OF THE DRAWINGS

The above and/or other exemplary aspects and advantages will be more apparent by describing certain exemplary embodiments with reference to the accompanying drawings, in which.

DETAILED DESCRIPTION

Figure 1:
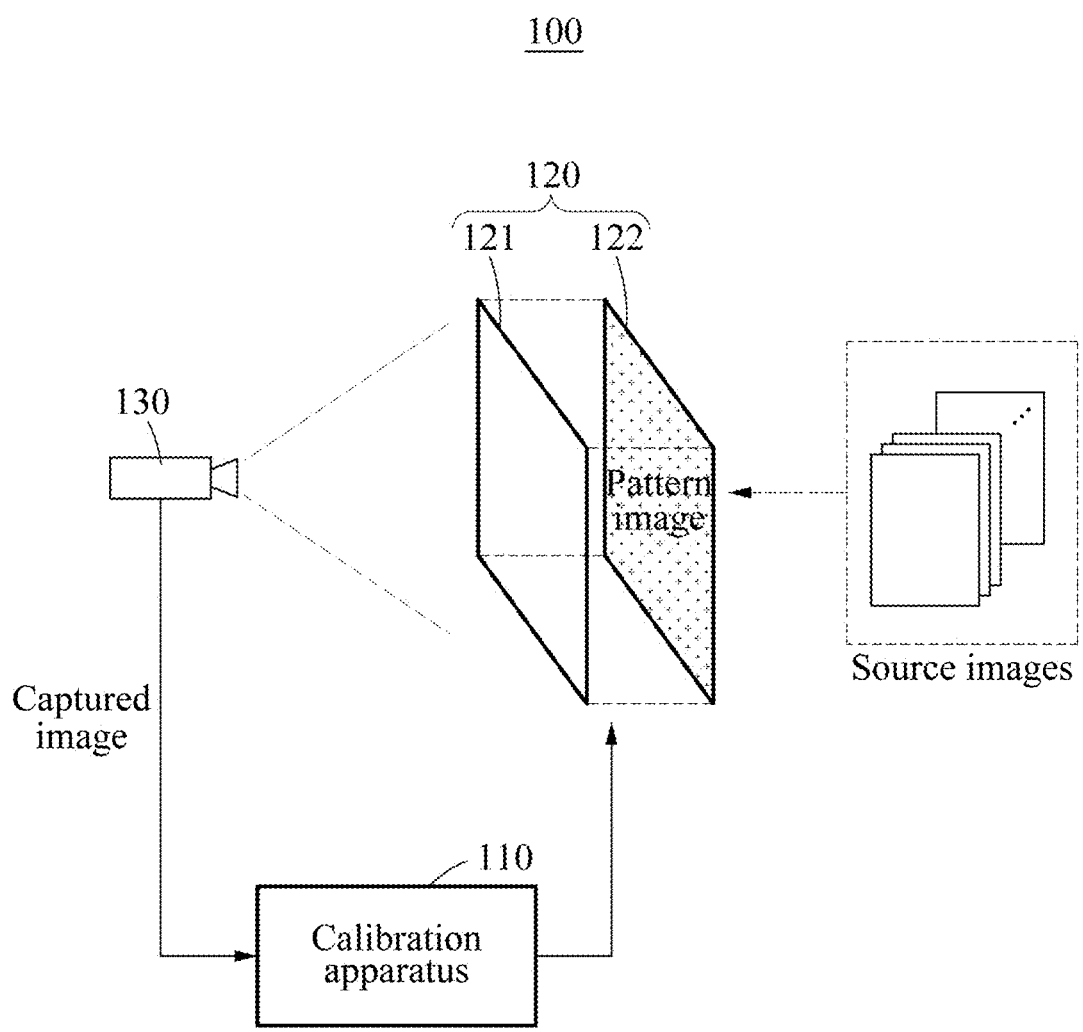
FIG. 1 is a diagram illustrating a calibration system according to an exemplary embodiment.

Reference will now be made in detail to exemplary embodiments which are illustrated in the accompanying drawings, wherein like reference numerals refer to the like elements throughout. Exemplary embodiments are described below in order to explain the present disclosure with reference to the figures.

The following structural or functional descriptions merely describe the exemplary embodiments, and the scope of the exemplary embodiments is not limited to the descriptions provided in the present specification. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

FIG. 1 is a diagram illustrating a calibration system according to an exemplary embodiment. Referring to FIG. 1, a calibration system 100 may include a calibration apparatus 110, a three-dimensional (3D) display apparatus 120, and a camera 130.

The 3D display apparatus 120 may include a 3D conversion device 121 and a display panel 122. Although not shown, the 3D display apparatus 120 may further include a processor and a memory. The 3D display apparatus 120 may use the processor and the memory to perform operations as described below.

The 3D display apparatus 120 may generate a pattern image based on source images. The source images may be stored in the 3D display apparatus 120, provided to the 3D display apparatus 120 by the calibration apparatus 110, or provided to the 3D display apparatus 120 by another apparatus external to the 3D display apparatus 120. The source images may each correspond to a predetermined view to be seen from a corresponding viewpoint. When n source images are provided, the n source images may correspond to a first view through an nth view. As further described below, the 3D display apparatus 120 may generate a pattern image such that images are viewed from the viewpoints corresponding to the source images.

The 3D display apparatus 120 may display a pattern image on the display panel 122. The pattern image may be understood as a pattern image generated based on source images including a predetermined pattern. The 3D conversion device 121 may convert the pattern image into a 3D image based on an autostereoscopic method. The 3D conversion device 121 may include an optical layer such as a lens array, a parallax barrier, and a directional backlight unit (BLU). The lens array and the parallax barrier may be disposed on a front side of the display panel 122. The directional BLU may be disposed on a rear side of the display panel 122. Although FIG. 1 illustrates the 3D conversion device 121 on the front side of the display panel 122, the 3D conversion device 121 may also be disposed on the rear side of the display panel 122 together with the directional BLU.

The 3D conversion device 121 may assign a directivity to light provided to the display panel 122 or output from the display panel 122. Different images may be directed to the left and right eyes of a viewer using directional light, so that the viewer experiences a 3D effect. When the different images are inaccurately directed in the autostereoscopic method, crosstalk may occur in the resultant 3D image. For example, the crosstalk may occur when an error in a process of manufacturing or installing the 3D display apparatus 120 results in a difference between an actual value and a designed value of a parameter of the 3D display apparatus 120. The parameter of the 3D display apparatus 120 may also be referred to as a parameter of the 3D conversion device 121. The parameter of the 3D display apparatus 120 may include a pitch parameter that indicates a horizontal period of a unit element of the 3D conversion device 121, a start position parameter that indicates relative positions of the 3D conversion device 121 and the display panel 122, a slanted angle parameter that indicates a gradient of the unit element of the 3D conversion device 121, and a gap parameter that indicates a distance between the 3D conversion device 121 and the display panel 122.

The camera 130 may capture the 3D display apparatus 120 displaying the pattern image and transmit the captured image to the calibration apparatus 110. The 3D display apparatus 120 may detect a location of the camera 130. The 3D display apparatus 120 may detect the location of the camera 130 using a separate camera (not shown) provided in or around the 3D display apparatus 120. The 3D display apparatus 120 may render a 3D image corresponding to the detected location of the camera 130. The 3D display apparatus 120 may set a reference view of the 3D image and render the 3D image such that the 3D image of the reference view is visible from the detected location of the camera 130.

The calibration apparatus 110 may include a processor and a memory. The calibration apparatus 110 may use the processor and the memory to perform operations as described below. The memory may include instructions, such as software, to be read by the processor. When the instructions are executed in the processor, the processor may thereby perform the following operation. The calibration apparatus 110 may calibrate a difference between an actual value and a designed value of a parameter of the 3D display apparatus 120 based on a captured image. For example, a first calibration process using a first pattern image and a second calibration process using a second pattern image may be performed in sequence.

In the first calibration process, the calibration apparatus 110 may acquire a first captured image representing the 3D display apparatus 120 displaying the first pattern image and adjust a set of first parameters of the 3D display apparatus 120 based on the first captured image. An operation of acquiring the first captured image and an operation of adjusting the first parameter set may be performed repeatedly until a first condition is satisfied in the first calibration process. In the second calibration process, the calibration apparatus 110 may acquire a second captured image representing the 3D display apparatus 120 displaying the second pattern image and adjust a set of second parameters of the 3D display apparatus 120 based on the second captured image. An operation of acquiring the second captured image and an operation of adjusting the second parameter set may be performed repeatedly until a second condition is satisfied.

It should be understood that adjusting a parameter of the 3D display apparatus 120 by the calibration apparatus 110 includes adjusting a parameter of the 3D display apparatus 120 by the 3D display apparatus 120 based on a control signal transmitted from the calibration apparatus 110. The 3D display apparatus 120 may receive a first control signal generated based on the first captured image and adjust the first parameter set based on the first control signal. Also, the 3D display apparatus 120 may receive a second control signal generated based on the second captured image and adjust the second parameter set based on the second control signal. When the calibration apparatus 110 is to perform an operation that needs to be processed in the 3D display apparatus 120, the calibration apparatus 110 may transmit a control signal to the 3D display apparatus 120 such that the 3D display apparatus 120 performs the operation.

The first pattern image may be generated based on first source images, each including a horizontal line. The second pattern image may be generated based on second source images, each including a vertical line. The first parameter set may include the pitch parameter and the start position parameter. The second parameter set may include the slanted angle parameter and the start position parameter. As further discussed below, the pitch parameter may be calibrated independently of other parameters based on a horizontal pattern. After the pitch parameter is calibrated, the slanted angle parameter may be easily calibrated based on a vertical pattern. Also, once the pitch parameter is calibrated, the slanted angle parameter may be calibrated independently of other parameters.

A process of calibration performed using a sequence of a horizontal pattern and a vertical pattern may be efficiently performed at a lower resolution in comparison to a process of calibration using a complex pattern such as a check pattern. Since the horizontal pattern-based calibration and the vertical pattern-based calibration are performed separately, the complexity of capturing a pattern image and analyzing the pattern image may be reduced. Autostereoscopic 3D image technology may be implemented in a low-resolution device such as a heads up display (HUD). As compared to a related art display device, an HUD may have a longer viewing distance and a resolution that is insufficient for estimating a parameter using a single pattern image. Also, due to a catadioptric system included in the HUD, distortion may occur in a 3D image. In the present example, calibrations may be sequentially performed using simple patterns and thus, may provide a low-resolution device or a device including the catadioptric system with high performance capabilities.

The calibration apparatus 110 may be separate from the 3D display apparatus 120 as illustrated in FIG. 1. The calibration apparatus 110 may also be a part of the 3D display apparatus 120. When the calibration apparatus 110 is included in the 3D display apparatus 120, the calibration apparatus 110 may be a part of a processor of the 3D display apparatus 120, may be a chip separate from the processor, or may be a timing controller, for example, T con. The 3D display apparatus 120 may include a device such as an HUD that creates an aerial mage using a catadioptric system as well as a related art 3D display device.

Figure 2:
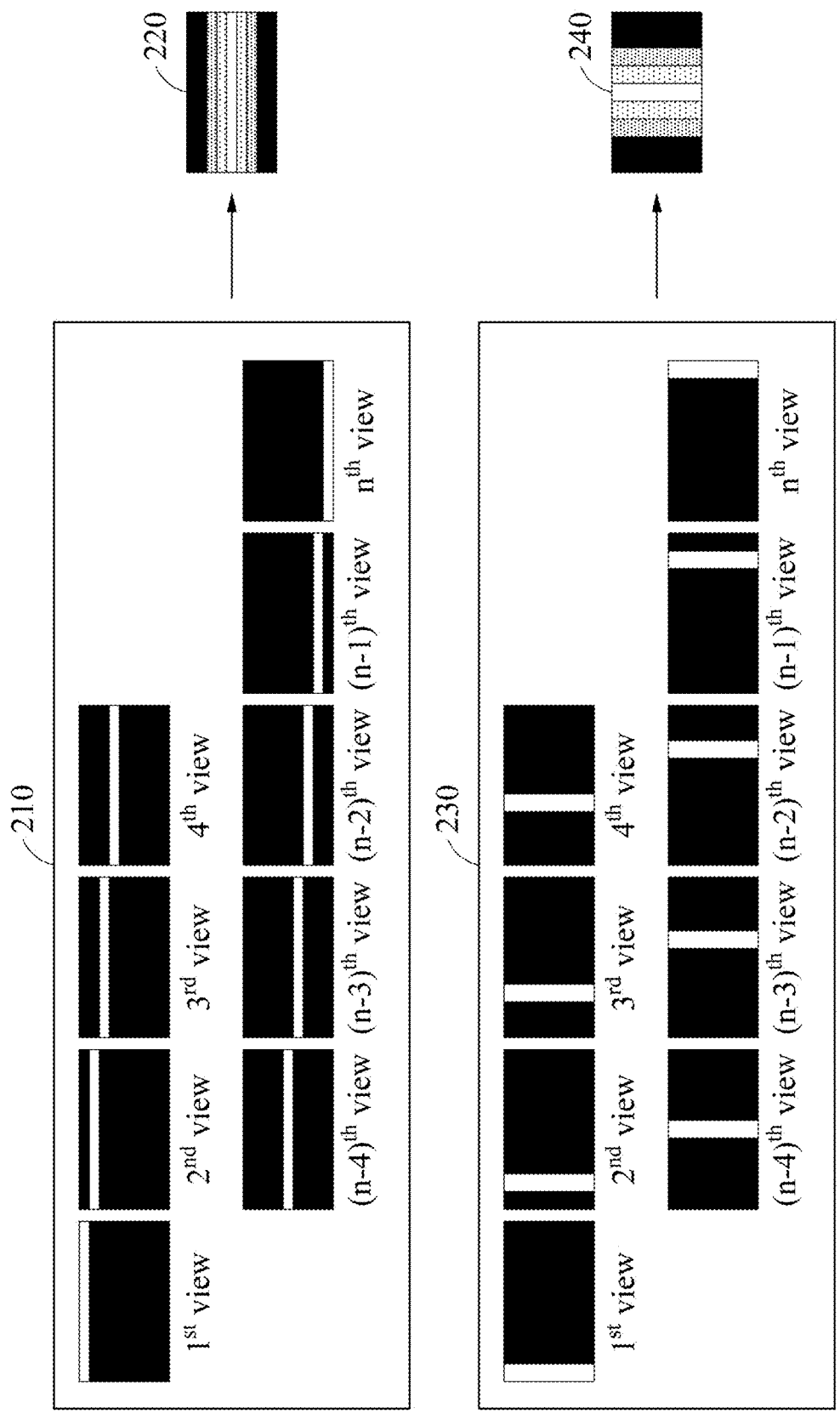
FIG. 2 is a diagram illustrating source images and captured images according to an exemplary embodiment.

FIG. 2 is a diagram illustrating source images and captured images according to an exemplary embodiment. Referring to FIG. 2, first source images 210 and second source images 230 may correspond to a plurality of views, for example, a first view through an nth view. The first source images 210 may each include a horizontal line at a different position based on a corresponding view. The second source images 230 each include a vertical line at a different position based on a corresponding view. The first source images 210 may be used to generate a first pattern image. The second source images 230 may be used to generate a second pattern image.

When a predetermined parameter is to be calibrated, a calibration pattern may be used which enables an easy determination of whether the parameter has been calibrated. The first source images 210 may be black in all areas other than the position of the horizontal line. The second source images 230 may be black in all areas other than the position of vertical line. The first source images 210 may be used to calibrate a pitch parameter. The second source images 230 may be used to calibrate a slanted angle parameter.

A 3D display apparatus may detect a location of a camera and determine a position at which each source image is to be represented by dividing, into n portions without repetitions, a single area on which a 3D image is displayed based on the location of the camera. For example, the single area may be a view cone. The 3D display apparatus may generate a pattern image through a light field rendering such that an image of each view is represented at the determined position, such that it is visible from a corresponding viewpoint. For example, a location of a camera may be a viewpoint from which the $(n-4)^{th}$ view is apparent, and a pattern image may be rendered based on the $(n-4)^{th}$ view as a reference view. In this example, when a parameter calibration is completed, and when the pattern image is represented, a first captured image 220 and a second captured image 240 may be acquired through the camera. In an ideal environment, each of the first captured image 220 and the second captured image 240 would be the same as a source image corresponding to the $(n-4)^{th}$ view. In a real environment in which crosstalk occurs, each of the first captured image 220 and the second captured image 240 may be captured by adding a gradation to the source image corresponding to the $(n-4)^{th}$ view.

When calibration of the pitch parameter is not completed, the linear pattern appearing in the first captured image 220 may not be horizontal. When calibration of the slanted angle parameter is not completed, the linear pattern appearing in the second captured image 240 may not be vertical. The calibration apparatus may calculate a gradient of the linear pattern appearing in the first captured image 220 and calculate a value of the pitch parameter for the linear pattern to be shown horizontally. Also, the calibration apparatus may calculate a gradient of the linear pattern appearing in the second captured image 240 and calculate a value of the slanted angle parameter for the linear pattern to be shown vertically. In this example, since only the gradients of the linear patterns are calculated, the required resolution of the camera may be comparatively low.

The start position parameter may be easily calibrated using the first pattern image and the second pattern image. The start position parameter may indicate a relative horizontal position between a 3D conversion device and a display panel. For example, a reference position may be defined for each of the 3D conversion device and the display panel. In this example, the start position parameter may be determined based on a horizontal difference between the reference position of the 3D conversion device and the reference position of the display panel. The start position parameter may not affect the gradient of the linear pattern of the first captured image 220 and the gradient of the linear pattern of the second captured image 240. Conversely, the start position parameter may affect a position of the linear pattern of the first captured image 220 and a position of the linear pattern of the second captured image 240. Thus, the pitch parameter and the start position parameter may be adjusted independently of each other based on the first captured image 220. Also, the slanted angle parameter and the start position parameter may be adjusted independently of each other based on the second captured image 240.

The pitch parameter and a slanted angle parameter may affect each other. As further discussed below, a slanted angle parameter may be adjusted in a first calibration process using the first captured image 220, and then a slanted angle parameter may be easily adjusted in a second calibration process using the second captured image 240 based on the slanted angle parameter adjusted in the first calibration process.

A start position parameter adjusted in the first calibration process and a start position parameter adjusted in the second calibration process may be the same. For example, when the calibration of the start position parameter is completed in the first calibration process, the linear pattern of the first captured image 220 may be positioned on a vertical center. In this example, the linear pattern of the second captured image 240 may be positioned on a horizontal center without need to separately calibrate the start position parameter in the second calibration process. As such, the start position parameter may be calibrated in the first calibration process and the second calibration process. The start position parameter may be coarsely adjusted in the first calibration process and precisely adjusted in the second calibration process. In the foregoing example, a condition for terminating the first calibration process may be set more generously than a condition for terminating the second calibration process.

Figure 3:
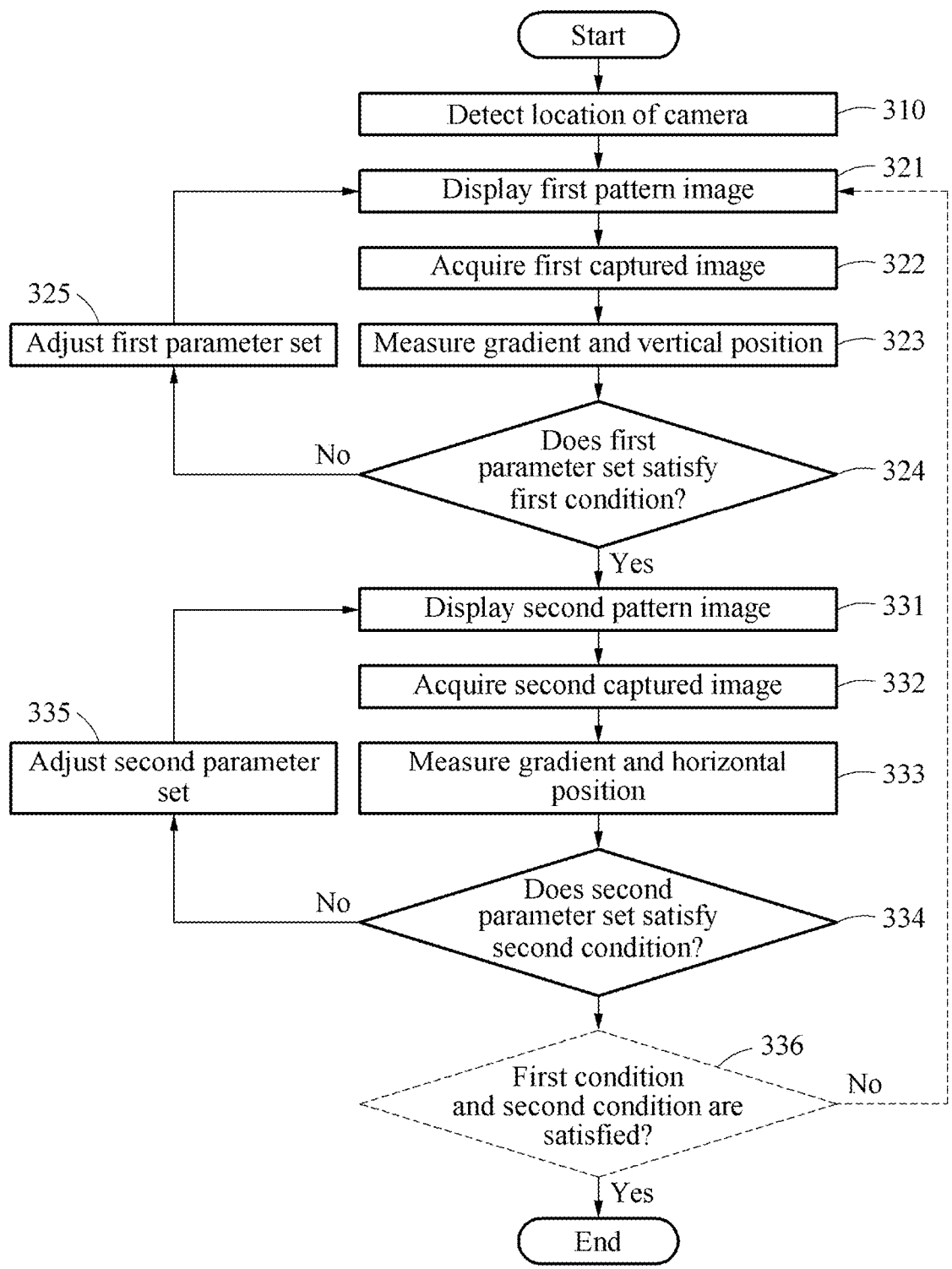
FIG. 3 is a flowchart illustrating a calibration process according to an exemplary embodiment.

FIG. 3 is a flowchart illustrating a calibration process according to an exemplary embodiment. Referring to FIG. 3, in operation 310, a 3D display apparatus may detect a location of a camera. Here, the camera may be provided to capture a display apparatus for calibration and may also be referred to as, for example, a calibration camera. The display apparatus may use a camera separate from the calibration camera to capture the calibration camera and to detect the location of the calibration camera. When the location is detected, the 3D display apparatus may render a 3D image such that a source image of a reference view is visible from the detected location.

Operations 321 through operation 325 may be included in a first calibration process. In operation 321, the 3D display apparatus may display a first pattern image. The 3D display apparatus may render a 3D image based on the first pattern image such that a source image including a horizontal line on a vertical center is viewed at a detected camera location. For brevity of description, the source image including the horizontal line on the vertical center may also be referred to as a first source image. The first pattern image may be converted into a 3D image by a 3D conversion device. In operation 322, a calibration apparatus may acquire a first captured image. The first captured image may be an image acquired by capturing the 3D display apparatus displaying the first pattern image. The first captured image may be captured by the calibration camera and provided to the calibration apparatus.

The calibration apparatus may perform a first calibration by warping the first captured image. For example, the 3D display apparatus may display a warped image such as a chessboard. The camera may capture a display apparatus displaying the warped image and transmit a captured image to the calibration apparatus. The calibration apparatus may determine a warping parameter based on the captured image and warp the first captured image based on the determined warping parameter.

In operation 323, the calibration apparatus may measure a gradient and a vertical position of a linear pattern represented in the first captured image. In this example, the gradient may indicate an angle slanted relative to a horizontal line. The linear pattern may include at least one line. The at least one line may be at a predetermined angle instead of being horizontal or vertical. For brevity of description, the linear pattern represented in the first captured image may also be referred to as a first linear pattern. Since the 3D image is rendered to allow the first source image to be viewed at the detected camera location, the first captured image may include the first source image to which a gradation is added when calibration is completed. Thus, the gradient may be measured horizontally, and the vertical position may be measured based on the vertical center. When calibration of a pitch parameter is not completed, the first captured image may include a slanted linear pattern. When calibration of a start position parameter is not completed, the first captured image may include a linear pattern at a position offset in one direction from the vertical center. In this example, the gradient may be measured as a predetermined angle with respect to the horizontal, and the vertical position may be measured as a position offset by a predetermined distance from the vertical center instead of the vertical center.

In operation 324, the calibration apparatus may determine whether a first parameter set satisfies a first condition. The first condition may include the gradient of the first linear pattern being less than a first threshold and a reference line of the first linear pattern being positioned within a first range. The reference line may be extracted from a linear pattern to determine a gradient and a vertical position of the linear pattern. When the linear pattern includes a plurality of lines, the reference line may correspond to one of the plurality of lines. A process of extracting the reference line will be further described later. The first condition may be previously set based on experimental data or user setting.

When the first parameter set does not satisfy the first condition, operation 325 may be performed. In operation 325, the calibration apparatus may adjust the first parameter set. The first parameter set may include a pitch parameter and a start position parameter. The calibration apparatus may adjust the pitch parameter such that the gradient of the first linear pattern changes to be horizontal. The calibration apparatus may adjust the start position parameter such that the vertical position of the first linear pattern changes to the vertical center. The gradient of the first linear pattern may be determined based on the pitch parameter. The pitch parameter and the start position parameter may be adjusted independently of each other. When the pitch parameter is calibrated, the gradient of the first linear pattern may be approximately horizontal, and then the vertical position of the first linear pattern may be readily adjusted in a horizontal state. Thus, the start position parameter may be adjusted after the pitch parameter is adjusted.

The calibration apparatus may modify the adjustment of the first parameter set based on the number of lines included in the first linear pattern. When the first linear pattern includes a single line, the calibration apparatus may measure a gradient of the single line, adjust the pitch parameter by a first value, and adjust the pitch parameter by a second value based on a gradient change of the single line changing in response to the pitch parameter being adjusted by the first value. Hereinafter, the term "gradient change" may include a direction in which a gradient changes and a degree of change in gradient. The foregoing example is also applicable when the first linear pattern includes a plurality of lines.

Additionally, when the first linear pattern includes a plurality of lines, a secondary linear pattern may be detected from the first linear pattern. A relationship may be established among a current value of the pitch parameter, an actual value of the pitch parameter, and a pitch of the secondary linear pattern. Based on the relationship, the actual value of the pitch parameter may be calculated. For example, when the first linear pattern includes a plurality of lines, the calibration apparatus may detect the secondary linear pattern represented by the plurality of lines, determine the actual value of the pitch parameter based on the pitch of the secondary linear pattern and the current value of the pitch parameter, and adjust the pitch parameter based on the determined actual value of the pitch parameter. A method of adjusting the first parameter set will be further described later.

When the first parameter set is adjusted in operation 325, operation 322 may be performed. The first captured image acquired in operation 322 may be an image obtained by applying the first parameter set adjusted in operation 325. When the first parameter set is adjusted in operation 325, in operation 321, the 3D display apparatus may update the first pattern image based on the adjusted first parameter set, and the calibration camera may capture the 3D display apparatus displaying the updated first pattern image and provide the first captured image to the calibration apparatus.

When the first parameter set satisfies the first condition, operation 331 may be performed. Operations 331 through 335 may be included in a second calibration process. In operation 331, the 3D display apparatus may display a second pattern image. The 3D display apparatus may display the second pattern image based on the first parameter set adjusted through the first calibration process. The 3D display apparatus may render a 3D image based on the second pattern image such that a source image including a vertical line on a horizontal center is viewed at a detected camera location. For brevity of description, the source image including the vertical line on the horizontal center may also be referred to as a second source image. The second pattern image may be converted into a 3D image by the 3D conversion device. In operation 332, the calibration apparatus may acquire a second captured image. The second captured image may indicate an image acquired by capturing the 3D display apparatus displaying the second pattern image. The second captured image may be captured by the calibration camera and provided to the calibration apparatus. The calibration apparatus may perform a second calibration by warping the second captured image.

In operation 333, the calibration apparatus may measure a gradient and a horizontal position of a linear pattern represented in the second captured image. In this example, the gradient may indicate an angle slanted relative to a vertical line. For brevity of description, the linear pattern represented in the second captured image may also be referred to as a second linear pattern. Since the 3D image is rendered to allow the second source image to be viewed at the detected camera location, the second captured image may include the second source image to which a gradation is added when calibration is completed. Thus, the gradient may be measured vertically, and the horizontal position may be measured based on the horizontal center. When calibration of a slanted angle parameter is not completed, the second captured image may include a slanted linear pattern. When calibration of a start position parameter is not completed, the second captured image may include a linear pattern at a position offset in one direction from the horizontal center. In this example, the gradient may be measured as a predetermined degree of an angle with respect to the vertical, and the horizontal position may be measured as a position offset by a predetermined distance from the horizontal center, instead of the horizontal center.

In operation 334, the calibration apparatus may determine whether a second parameter set satisfies a second condition. The second condition may include the gradient of the second linear pattern being less than a second threshold and a reference line of the second linear pattern represented in the second captured image being positioned within a second range. The second condition may be previously set based on experimental data or user setting.

When the second parameter set does not satisfy the second condition, operation 335 may be performed. In operation 335, the calibration apparatus may adjust the second parameter set. The second parameter set may include a slanted angle parameter and a start position parameter. The calibration apparatus may adjust the slanted angle parameter such that the gradient of the second linear pattern changes to be vertical. The calibration apparatus may adjust the start position parameter such that the horizontal position of the second linear pattern changes to the horizontal center. When the calibration of the pitch parameter is completed, the gradient of the second linear pattern may be determined based on the slanted angle parameter, and the slanted angle parameter and the start position parameter may be adjusted independently of each other. When the slanted angle parameter is calibrated, the gradient of the second linear pattern may be approximately vertical, and then the horizontal position of the second linear pattern may be readily adjusted in a vertical state. Thus, the start position parameter may be adjusted after the slanted angle parameter is adjusted. The start position parameter adjusted in the second calibration process may be the same as the start position parameter adjusted in the first calibration process. When the calibration of the start position parameter is completed in the first calibration process, the start position parameter may be slightly adjusted or maintained in the second calibration process.

Similarly to the first calibration process, the calibration apparatus may modify the adjustment of the second parameter set based on the number of lines included in the second linear pattern. When the second linear pattern includes a single line, the calibration apparatus may adjust the slanted angle parameter in a current iteration operation based on a gradient change of the single line changing in response to the slanted angle parameter being adjusted in a previous iteration operation. The foregoing example is also applicable when the second linear pattern includes a plurality of lines. When the second linear pattern includes a plurality of lines, a secondary linear pattern may be detected from the second linear pattern. An actual value of the slanted angle parameter may be determined based on a pitch of the secondary linear pattern and a current value of the slanted angle parameter. A method of adjusting the second parameter set will be further described later.

When the second parameter set is adjusted in operation 335, operation 331 and operation 332 may be repeated. The second captured image acquired in operation 332 may be an image obtained by applying the second parameter set adjusted in operation 335. When the second parameter set satisfies the second condition, the calibration may be terminated. When it is determined that the second parameter set satisfies the second condition, operation 336 may be performed to verify whether the first condition and the second condition are satisfied. When it is verified that the first condition and the second condition are not satisfied, operation 321 may be performed. The foregoing explanation described about the first calibration process may also be applied to the second calibration process.

Figure 4:
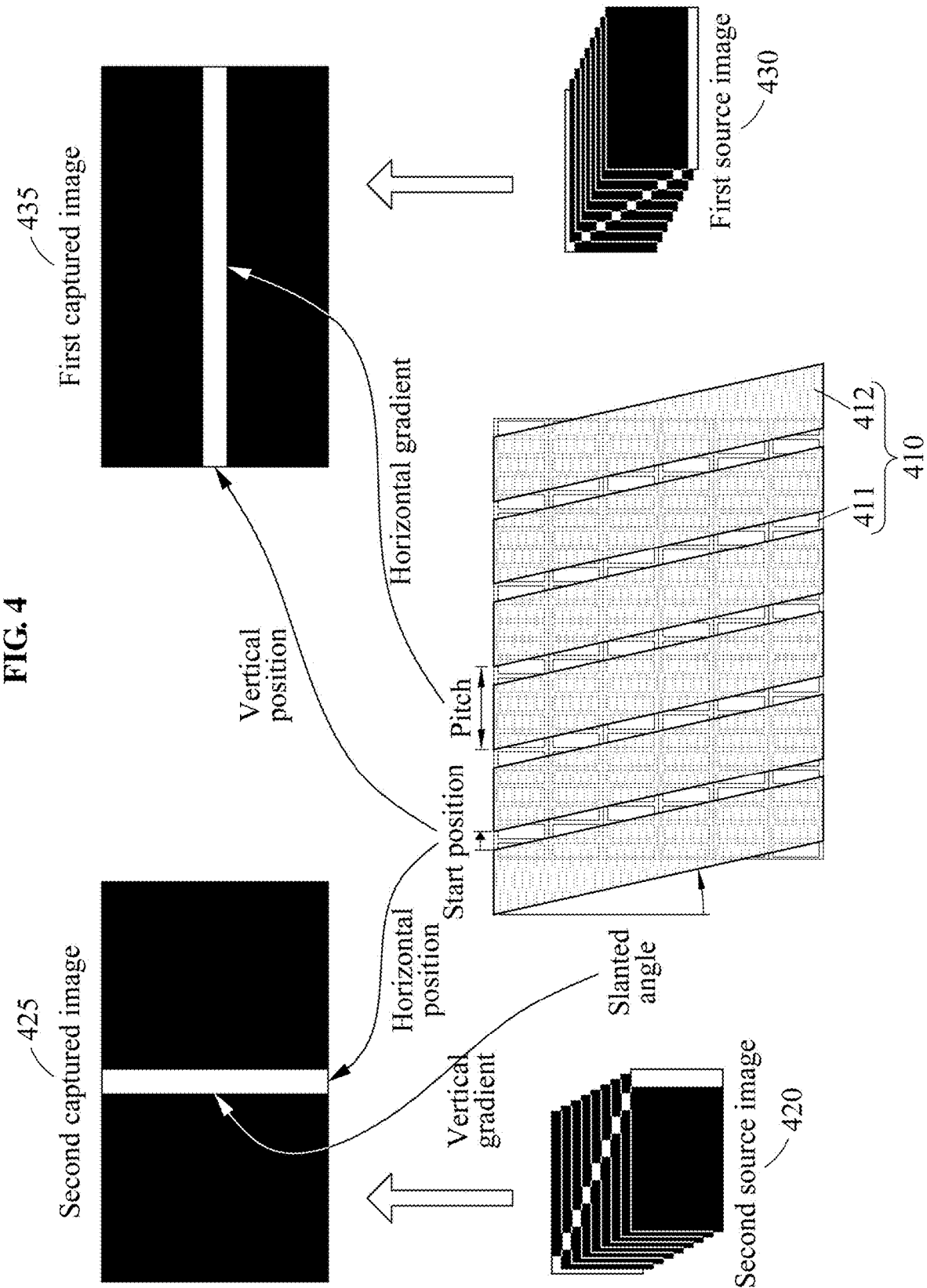
FIG. 4 is a diagram illustrating a relationship between a linear pattern of a captured image and parameters of a three-dimensional (3D) display apparatus according to an exemplary embodiment.

FIG. 4 is a diagram illustrating a relationship between a linear pattern of a captured image and parameters of a 3D display apparatus according to an exemplary embodiment. Referring to FIG. 4, a first captured image 435 may be obtained based on a first source image 430 and a second captured image 425 may be obtained based on a second source image 420. FIG. 4 illustrates that the first captured image 435 and the second captured image 425 are acquired in a state in which calibration has been completed and an ideal environment in which a crosstalk is absent for brevity.

A pitch, a start position, and a slanted angle may be defined for a display apparatus 410. A 3D conversion device 412 may include unit elements. A unit element may be for assigning a directivity to an image output on a display panel 411. For example, the unit element may be a slit of a parallax barrier and a unit lens of lenticular lenses. The pitch may indicate a horizontal period of the unit element. A length of an interval in which a view is iterated in a 3D image may be determined based on the pitch. Using the pitch parameter, a gradient of a linear pattern in the first captured image 435 may be adjusted.

The slanted angle may indicate a gradient of the unit element relative to a vertical line. Since a tangent value of the slanted angle is used in a process of rendering, the calibration may also be performed based on the tangent value. A gradient of a linear pattern in the second captured image 425 may be adjusted using the slanted angle parameter. The start position may indicate a relative position between the unit element and a pixel in the display panel 411. The start position may be used for rendering as a horizontal offset based on a upper left end of the display panel 411. Using the start position parameter, a vertical position of the linear pattern in the first captured image 435 and a horizontal position of the linear pattern in the second captured image 425 may be adjusted.

Figure 5:
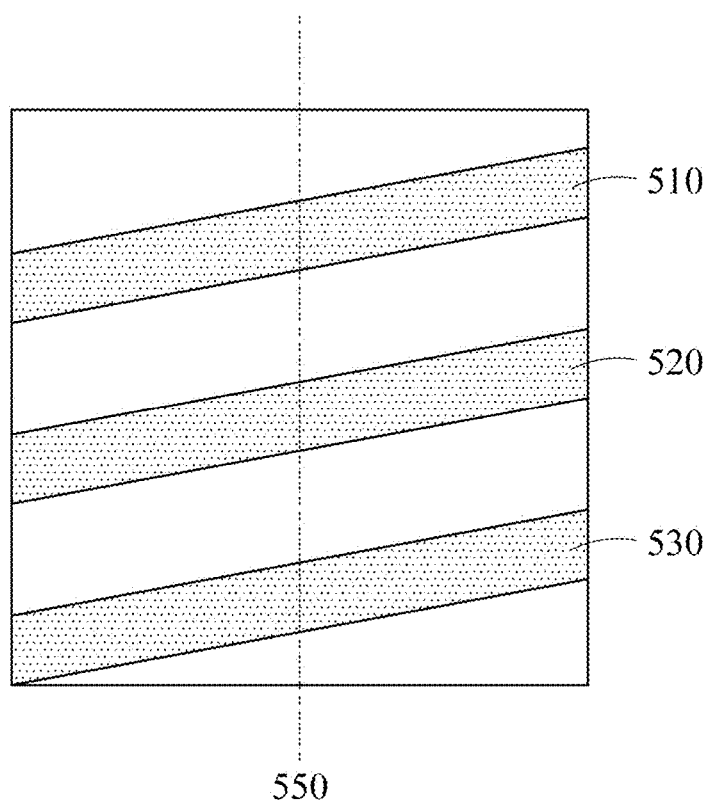
FIG. 5 is a diagram illustrating a process of extracting a reference line from a linear pattern according to an exemplary embodiment.

FIG. 5 is a diagram illustrating a process of extracting a reference line from a linear pattern according to an exemplary embodiment. A calibration apparatus may extract a reference line from a linear pattern and perform calibration using the reference line. When the linear pattern includes a single line, the single line may be determined to be the reference line. When the linear pattern includes a plurality of lines, one of the lines may be determined to be the reference line.

Referring to FIG. 5, a linear pattern may include a plurality of lines 510, 520, and 530. The calibration apparatus may determine one line from among the plurality of lines 510, 520, and 530 to be a reference line. The calibration apparatus may extract pixels included in the plurality of lines 510, 520, and 530 and determine a reference pixel from the extracted pixel. A pixel corresponding to a mean position in a distribution of the extracted pixels may be determined to be the reference pixel.

The calibration apparatus may extract pixels on a line 550 from among the pixels included in each of the plurality of lines 510, 520, and 530. The extracted pixels may all have the same x-coordinate value. Thus, a distribution of the extracted pixels may be determined based on y-coordinate values of the extracted pixels. The calibration apparatus may determine a pixel in a center position in the determined distribution to be a reference pixel. Unlike FIG. 5, when a linear pattern is formed vertically, the line 550 may be replaced with a horizontal line.

The calibration apparatus may determine a line including the determined reference pixel from among the plurality of lines 510, 520, and 530 to be the reference line. For example, when the line 520 includes the reference pixel, the line 520 may be determined to be the reference line. The calibration apparatus may calibrate a parameter based on a gradient of the reference line, a vertical position of the reference line, or a horizontal position of the reference line.

Figure 6:
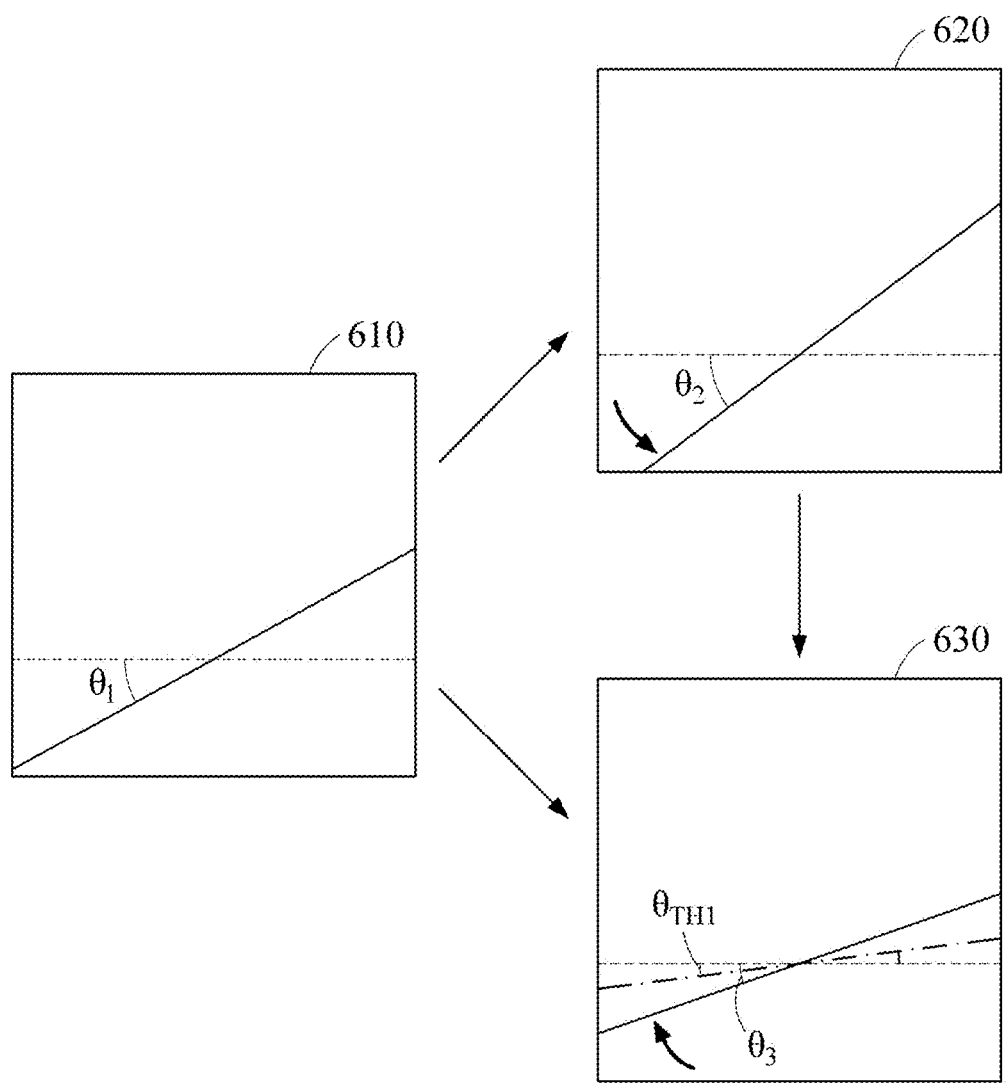
FIG. 6 is a diagram illustrating a process of adjusting a gradient of a linear pattern using a pitch parameter according to an exemplary embodiment.

FIG. 6 is a diagram illustrating a process of adjusting a gradient of a linear pattern using a pitch parameter according to an exemplary embodiment. Referring to FIG. 6, the calibration apparatus may measure a gradient $\theta_1$ of a line represented in a first captured image 610. In the example of FIG. 6, a gradient may be an angle with respect to a horizontal line. Calibration may be performed such that the line represented in the first captured image 610 is approximate to the horizontal line. Thus, the calibration apparatus may perform the calibration of a pitch parameter until the gradient is less than the threshold $\theta_{TH1}$.

The calibration apparatus may adjust the pitch parameter by a value $\alpha 1$. A first captured image 620 may be obtained based on the pitch parameter adjusted by the value $\alpha 1$. In response to the pitch parameter being adjusted by the value $\alpha 1$, the gradient $\theta 1$ may be changed to a gradient $\theta 2$. The calibration apparatus may measure a gradient change based on the gradient $\theta 1$ and the gradient $\theta 2$. The gradient change may include a direction in which a gradient changes and a degree of change in gradient. The calibration apparatus may determine a value $\alpha 2$ based on the measured gradient change and adjust the pitch parameter by the value $\alpha 2$.

As illustrated in FIG. 6, the gradient $\theta 2$ may be greater than the gradient $\theta_1$. Since the gradient changes in a direction opposite to a target direction, the calibration apparatus may set the value $\alpha 2$ to be opposite to the value $\alpha 1$. For example, when the value $\alpha 1$ is a positive value, the value $\alpha 2$ may be set to a negative value. Also, a size of the value $\alpha 2$ may be determined based on a degree of change in gradient associated with the value $\alpha 1$ A first captured image 630 may be obtained based on the pitch parameter adjusted by the value $\alpha 2$. Since a gradient $\theta 3$ is less than the gradient $\theta 2$, a gradient changing direction associated with the value $\alpha 2$ may correspond to the target direction. The calibration apparatus may determine a value $\alpha 3$ based on a degree of change in gradient between the gradient $\theta 2$ and the gradient $\theta 3$. For example, the calibration apparatus may maintain a sign of the value $\alpha 3$ to be the same as that of the value $\alpha 2$ and determine a size of the value $\alpha 3$ based on a degree of change in gradient. When the first captured image 630 is obtained by adjusting the pitch parameter by the value $\alpha 1$, the calibration apparatus may maintain the sign of the value $\alpha 3$ to be the same as that of the value $\alpha 1$ and determine the size of the value $\alpha 3$ based on a degree of change between the gradient $\theta 1$ and the gradient $\theta 3$. The calibration apparatus may adjust the pitch parameter by the value $\alpha 3$.

The calibration apparatus may repetitively perform the foregoing process until the gradient is less than the threshold $\theta_{TH1}$.

Figure 7:
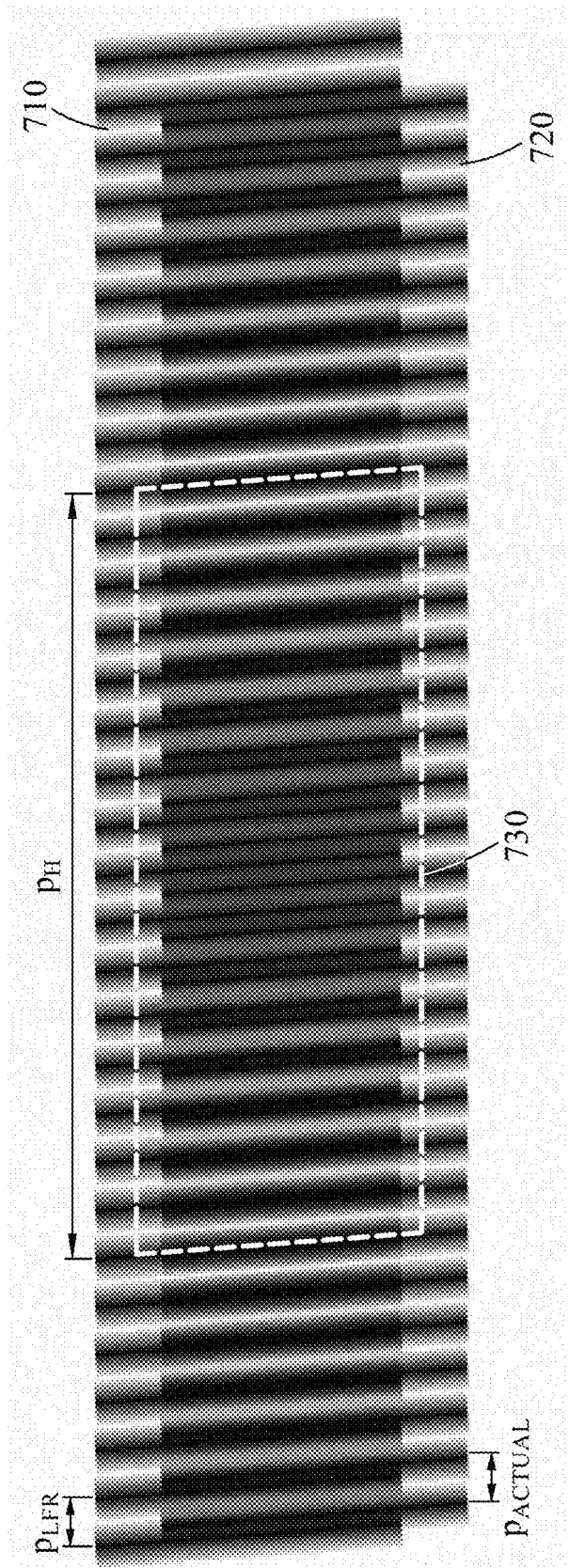
FIG. 7 is a diagram illustrating a relationship among a current pitch, an actual pitch, and a secondary linear pattern according to an exemplary embodiment.

FIG. 7 is a diagram illustrating a relationship among a current pitch, an actual pitch, and a secondary linear pattern according to an exemplary embodiment. When a first linear pattern includes a plurality of lines, a secondary linear pattern 730 may be detected due to a difference between a rendering form 710 based on $P_{LFR}$ and a rendering form 720 based on $P_{ACTUAL}$. Here, $P_{LFR}$ denotes a pitch parameter value used for current rendering and $P_{ACTUAL}$ denotes a pitch parameter value in an actually installed state. $P_{LFR}$ may be referred to as a current value of a pitch parameter and $P_{ACTUAL}$ may also be referred to as an actual value of the pitch parameter. Matching $P_{LFR}$ to $P_{ACTUAL}$ may be a target of pitch parameter calibration.

When $P_{LFR}$ is iterated n times, $P_{ACTUAL}$ may be iterated (n−1) times or (n+1) times. In this example, the secondary linear pattern 730 may be iterated once. A relationship among $P_{LFR}$, $P_{ACTUAL}$, and $P_H$ is expressed by Equation 1 as shown below.

$$n p_{LFR} = n \pm 1) p_{ACTUAL} = p_H \quad \text{[Equation 1]}$$

In Equation 1, $P_{LFR}$ denotes a current value of a pitch parameter, $P_{ACTUAL}$ denotes an actual value of the pitch parameter, $P_H$ denotes a pitch of the secondary linear pattern 730, and n is a positive integer. Equation 1 may be summarized for $P_{ACTUAL}$ to derive Equation 2 below.

$$p_{ACTUAL} = \frac{p_H p_{LFR}}{p_H \pm p_{LFR}} \quad \text{[Equation 2]}$$

According to Equation 2, it can be known that, if $P_H$ is infinite, $P_{ACTUAL}$ is equal to $P_{LFR}$ and $P_{ACTUAL}$ is determined using $P_H$ and $P_{LFR}$. $P_{LFR}$ may be a known value since it is the current value of the pitch parameter. $P_H$ may be measured by analyzing gaps between a plurality of lines represented in a first linear pattern. The calibration apparatus may determine $P_{ACTUAL}$ based on $P_H$ and $P_{LFR}$ and adjust the pitch parameter based on $P_{ACTUAL}$. Since both (+) and (−) signs are present in Equation 2, $P_{ACTUAL}$ may have two values. The calibration apparatus may sequentially apply the values to the pitch parameter, verify a first captured image, and determine one of the values to be the pitch parameter.

Figure 8:
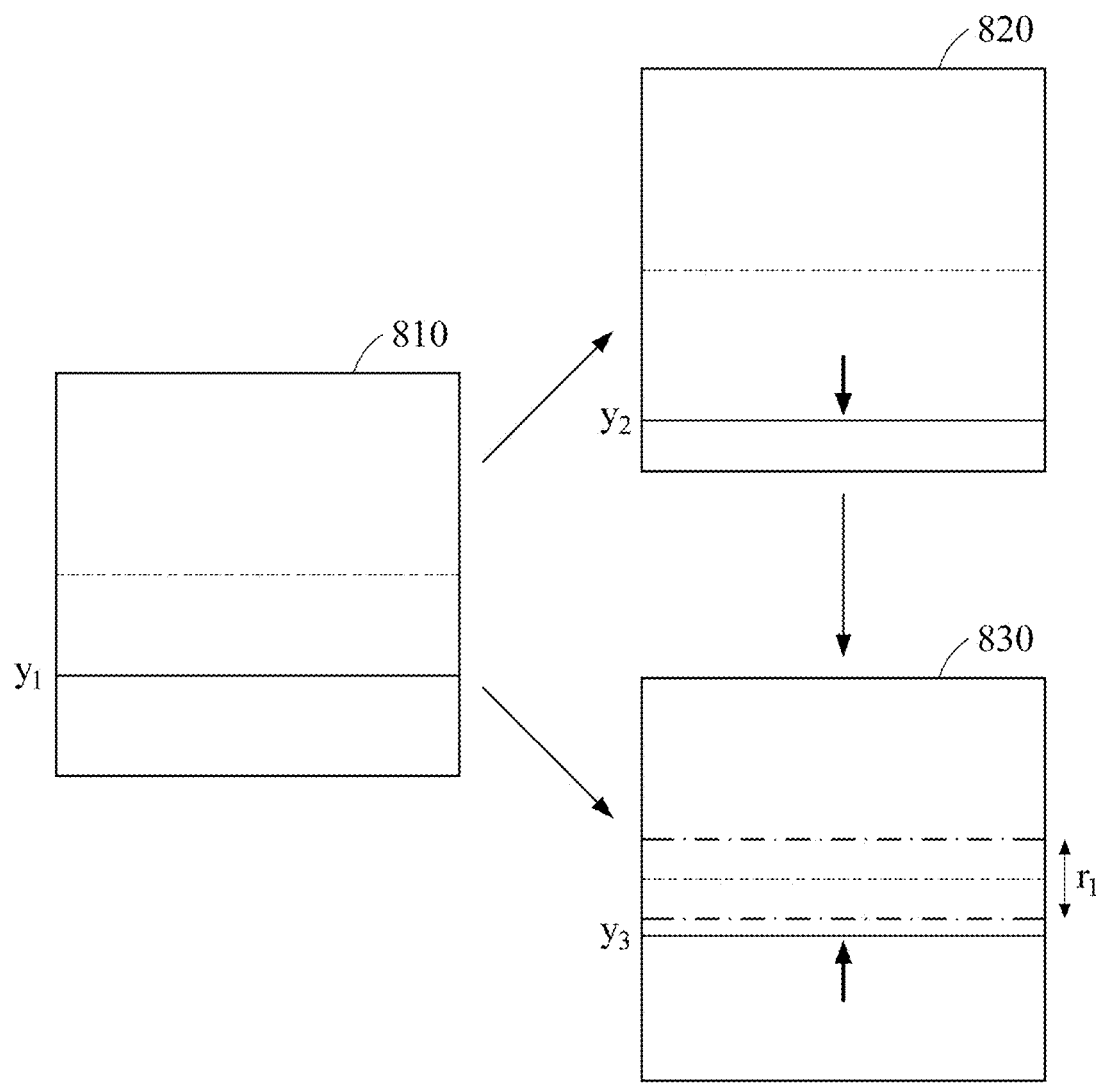
FIG. 8 is a diagram illustrating a process of adjusting a vertical position of a linear pattern using a start position parameter according to an exemplary embodiment.

FIG. 8 is a diagram illustrating a process of adjusting a vertical position of a linear pattern using a start position parameter according to an exemplary embodiment. A process of adjusting a vertical position of a linear pattern may be similar to a process of adjusting a gradient of a linear pattern using a pitch parameter as described with reference to FIG. 6. The process of FIG. 8 may use a start position parameter instead of a pitch parameter used in the process of FIG. 6. Also, a vertical position may be adjusted in the process of FIG. 8 whereas a gradient is adjusted in the process of FIG. 6.

Referring to FIG. 8, a calibration apparatus may measure a position of a line represented in a first captured image 810. The position of the line may be a vertical position. The measured position may be represented based on coordinates of pixels included in the line. In an example of FIG. 8, the position of the line may be expressed as a mean value of y coordinates of the pixels included in the line. Calibration may be performed so that the line represented in the first captured image 810 is approximate to a reference horizontal line. Thus, the calibration apparatus may repetitively perform calibration of a start position parameter so that the position of the line represented in the first captured image is included in a range $r_1$.

The calibration apparatus may adjust the start position parameter by a value $\alpha 1$. A first captured image 820 may be acquired based on the start position parameter adjusted by the value $\alpha 1$. In response to the start position parameter being adjusted by the value $\alpha 1$, a position $y_1$ may be changed to a position $y_2$. The calibration apparatus may measure a positional change based on the position $y_1$ and the position $y_2$. The positional change may include a direction in which a position changes and a degree of change in position. The calibration apparatus may determine a value $\alpha 2$ based on the measured positional change and adjust the start point parameter by the value $\alpha 2$.

As illustrated in FIG. 8, the position $y_2$ may be farther from the reference horizontal line in comparison to the position $y_1$. Since the position changes in a direction opposite to a target direction, the calibration apparatus may set the value $\alpha 2$ to be opposite to the value $\alpha 1$. A first captured image 830 may be obtained based on the start position parameter adjusted by the value $\alpha 2$. Since a position $y_3$ is closer to the reference horizontal line in comparison to the position $y_2$, a position changing direction associated with the value $\alpha 2$ may correspond to the target direction. The calibration apparatus may determine a value $\alpha 3$ based on a positional change between the position $y_2$ and the position $y_3$. For example, the calibration apparatus may maintain a sign of the value $\alpha 3$ to be the same as that of the value $\alpha 2$ and determine a size of the value $\alpha 3$ based on a degree of change in position. When the first captured image 830 is obtained by adjusting the start position parameter by the value $\alpha 1$, the calibration apparatus may maintain the sign of the value $\alpha 3$ to be the same as that of the value $\alpha 1$ and determine the size of the value $\alpha 3$ based on a degree of change between the position $y_1$ and the position $y_3$. The calibration apparatus may adjust the start position parameter by the value $\alpha 3$.

The calibration apparatus may repetitively perform the foregoing process until the position of the line is included in the range $r_1$.

Figure 9:
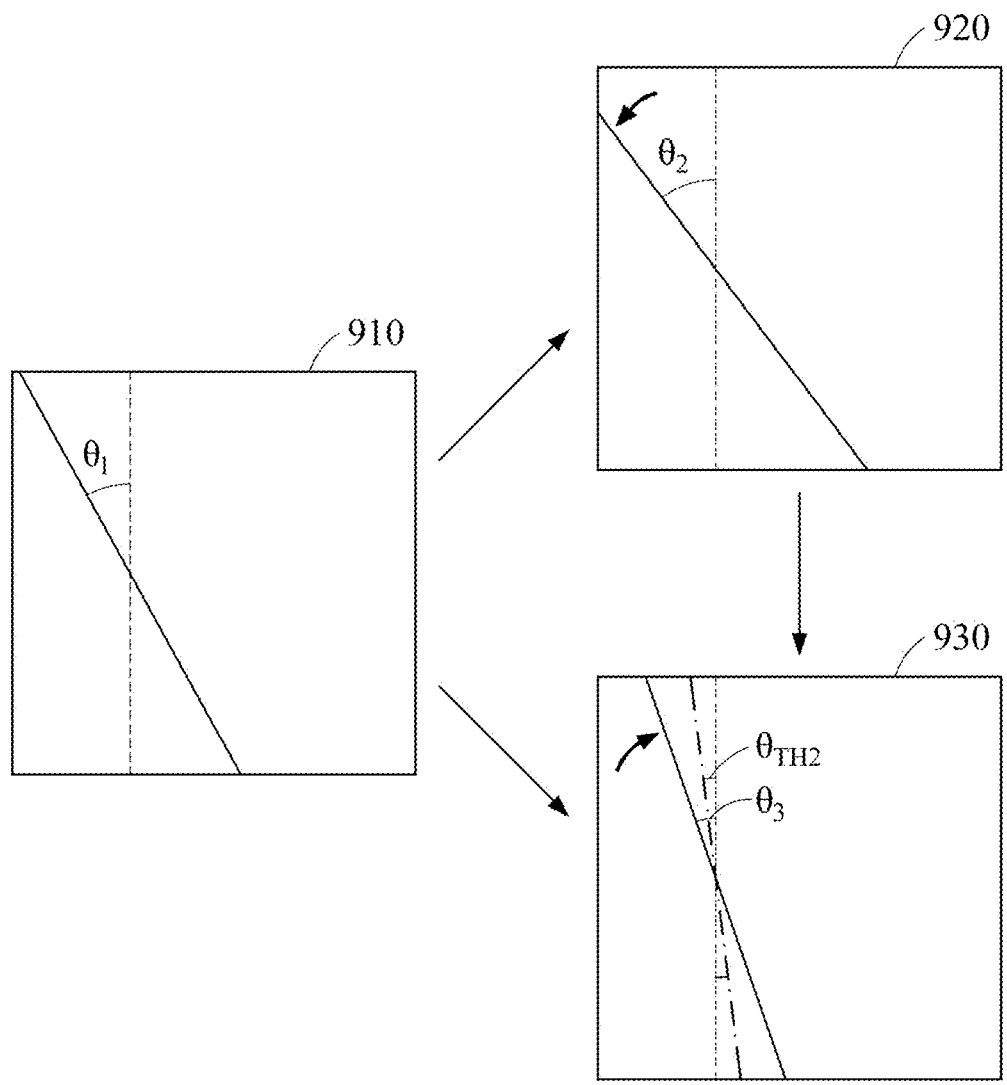
FIG. 9 is a diagram illustrating a process of adjusting a gradient of a linear pattern using a slanted angle parameter according to an exemplary embodiment.

FIG. 9 is a diagram illustrating a process of adjusting a gradient of a linear pattern using a slanted angle parameter according to an exemplary embodiment. A process of adjusting a gradient of a linear pattern using a slanted angle parameter may be similar to a process of adjusting a gradient of a linear pattern using a pitch parameter as described with reference to FIG. 6. The process of FIG. 9 may use a second captured image and a slanted angle parameter instead of a first captured image and a pitch parameter used in the process of FIG. 6. Also, a gradient may indicate an angle relative to a vertical line in an example of FIG. 9 whereas a gradient indicates an angle relative to a horizontal line in the example of FIG. 6.

A calibration apparatus may repetitively perform calibration of a slanted angle parameter such that a gradient of a line represented in a second captured image is less than a threshold $\theta_{TH2}$. Referring to FIG. 9, the calibration apparatus may measure a gradient $\theta 1$ of a line represented in a second captured image 910, adjust a slanted angle parameter by a value $\alpha 1$, and adjust the slanted angle parameter by a value $\alpha 2$ based on a gradient change associated with the slanted angle parameter being adjusted by the value $\alpha 1$. In this example, the gradient change may be measured based on the gradient $\theta 1$ and a gradient $\theta 2$. A second captured image 920 may be acquired after the slanted angle parameter is adjusted by the value $\alpha 1$. A second captured image 930 may be acquired after the slanted angle parameter is adjusted by the value $\alpha 2$. Since a gradient $\theta 3$ is greater than the threshold arm in the second captured image 930, the foregoing process may be repeated. The description of FIG. 6 may also be applied to a process of adjusting a gradient of a linear pattern using the slanted angle parameter.

Figure 10:
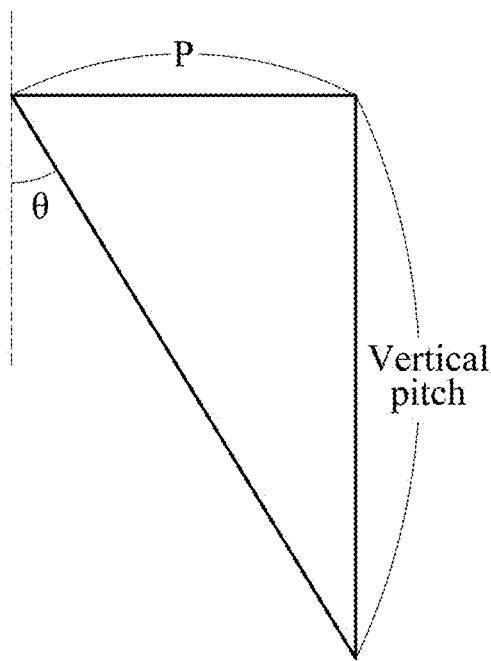
FIG. 10 is a diagram illustrating a relationship between a horizontal pitch and a vertical pitch according to an exemplary embodiment.

FIG. 10 is a diagram illustrating a relationship between a horizontal pitch and a vertical pitch according to an exemplary embodiment. As further discussed in FIG. 7, when a first linear pattern includes a plurality of lines, a secondary linear pattern may be detected from the first linear pattern. Similarly, when a second linear pattern includes a plurality of lines, a secondary linear pattern may be detected from the second linear pattern. For example, the secondary linear pattern may be detected based on the first linear pattern in a first calibration process. Also, the secondary linear pattern may be detected based on the second linear pattern in a second calibration process. An actual value of a slanted angle parameter may be calculated based on the secondary linear pattern based on a similar method as described with reference to FIG. 7.

A pitch may indicate a period of a unit element of a 3D conversion device. The pitch may include a horizontal pitch and a vertical pitch. A pitch parameter may be associated with the vertical pitch. The relationship of FIG. 10 may be established between the horizontal pitch and the vertical pitch. Referring to FIG. 10, P denotes a pitch parameter on which calibration is completed as described with reference to FIG. 7. In an example of FIG. 10, P may have the same value as $P_{ACTUAL}$ and $P_{LFR}$, each having been calibrated. Equation 3 may be derived based on Equation 2 and the relationship of FIG. 10.

$$\frac{P}{\tan \theta_{ACTUAL}} = \frac{p_V \frac{P}{\tan \theta_{LFR}}}{p_V \pm \frac{P}{\tan \theta_{LFR}}} \quad \text{[Equation 3]}$$

In Equation 3, P denotes a pitch parameter on which the calibration is completed, $P_V$ denotes a pitch of a secondary linear pattern detected from a second linear pattern, $\theta_{ACTUAL}$ denotes an actual value of a slanted angle parameter, and $\theta_{LFR}$ denotes a current value of the slanted angle parameter. Equation 3 may be summarized for $\tan \theta_{ACTUAL}$ to derive Equation 4 below.

$$\tan \theta_{ACTUAL} = \tan \theta_{LFR} \pm \frac{P}{p_V} \quad \text{[Equation 4]}$$

According to Equation 4, it can be known that, if P is calibrated and $P_V$ is infinite, $\tan \theta_{ACTUAL}$ is equal to $\tan \theta_{LFR}$ and $\theta_{ACTUAL}$ is determined based on P, $P_V$, and $\theta_{LFR}$. P may be a value calculated in advance. $\theta_{LFR}$ may be a known value since it is the current value of the slanted angle parameter. $P_V$ may be measured by analyzing gaps between a plurality of lines represented in a second linear pattern. The calibration apparatus may determine $\theta_{ACTUAL}$ based on P, $P_V$, and $\theta_{LFR}$ and adjust the slanted angle parameter based on $\theta_{ACTUAL}$. Since both (+) and (−) signs are present in Equation 4, $\theta_{ACTUAL}$ may have two values. The calibration apparatus may sequentially apply the values to the slanted angle parameter, verify a second captured image, and determine one of the values to be the slanted angle parameter.

Figure 11:
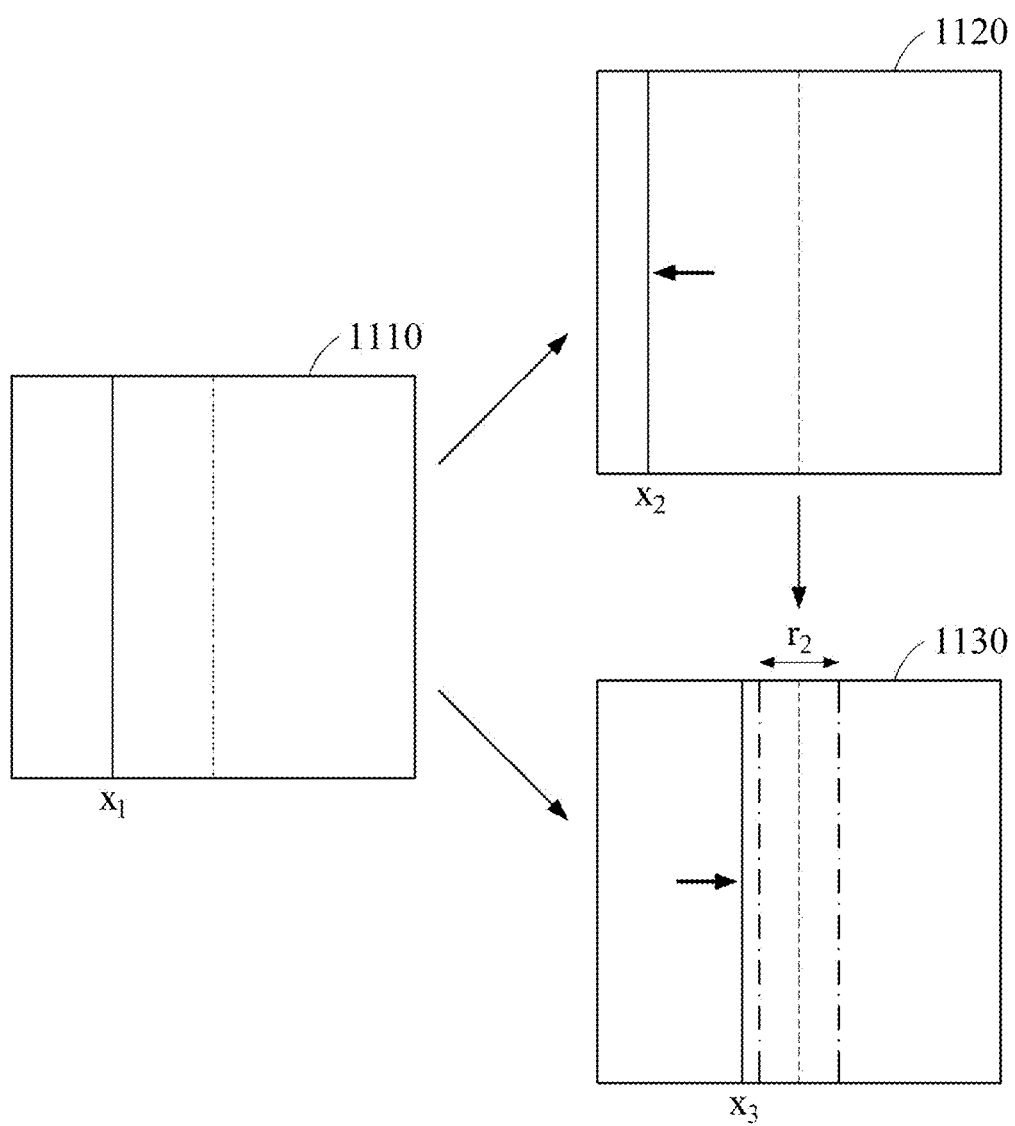
FIG. 11 is a diagram illustrating a process of adjusting a horizontal position of a linear pattern using a start position parameter according to an exemplary embodiment.

FIG. 11 is a diagram illustrating a process of adjusting a horizontal position of a linear pattern using a start position parameter according to an exemplary embodiment. A process of adjusting a horizontal position of a linear pattern may be similar to a process of adjusting a vertical position of a linear pattern as described with reference to FIG. 8. The process of FIG. 11 may use a second captured image instead of a first captured image used in the process of FIG. 8. Also, a horizontal position may be adjusted in the process of FIG. 11 whereas a vertical position is adjusted in the process of FIG. 8.

A calibration apparatus may repetitively perform calibration of a start point parameter such that a position of a line represented in a second captured image is within a range $r_2$. Referring to FIG. 11, the calibration apparatus may measure a position $x_1$ of a line represented in a second captured image 1110, adjust a start point parameter by a value $\alpha1$, and adjust the start position parameter by a value $\alpha2$ based on a positional change of the line associated with the start point parameter being adjusted by the value $\alpha1$. In this example, the positional change may be measured based on the position $x_1$ and a position $x_2$. A second captured image 1120 may be acquired after the start position parameter is adjusted by the value $\alpha1$. A second captured image 1130 may be acquired after the start position parameter is adjusted by the value $\alpha2$. Since a position $x_3$ is not included in the range r_TH2 in the second captured image 1130, the foregoing process may be repeated. The description of FIG. 8 may also be applied to a process of adjusting a horizontal position of a linear pattern using the start position parameter.

Figure 12:
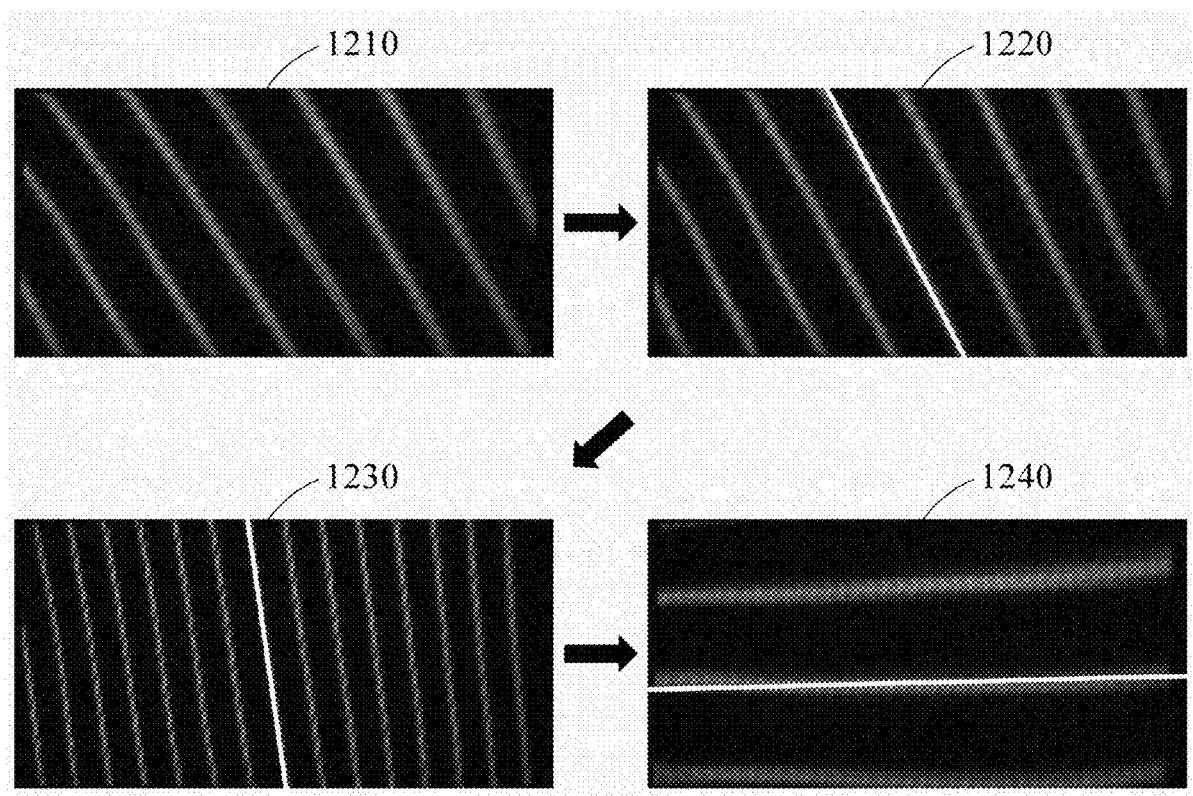
FIG. 12 is a diagram illustrating a process of changing a first captured image in a first calibration process according to an exemplary embodiment.

FIG. 12 is a diagram illustrating a changing process of a first captured image in a first calibration process according to an exemplary embodiment. Referring to FIG. 12, a first captured image 1210 through a first captured image 1240 may be acquired by adjusting a pitch parameter. Since a first linear pattern represented in the first captured image 1210 includes a plurality of lines, an actual value of the pitch parameter may be obtained using Equation 2. The obtained actual value of the pitch parameter may be applied to change the first captured image 1230 to the first captured image 1240. When it is verified that a gradient of a reference line of a first linear pattern is less than a threshold of a first condition in the first captured image 1240, calibration of the pitch parameter may be terminated. A position of the reference line of the first linear pattern is within a range of the first condition in the first captured image 1240 and thus, a start position parameter may not be adjusted separately.

Figure 13:
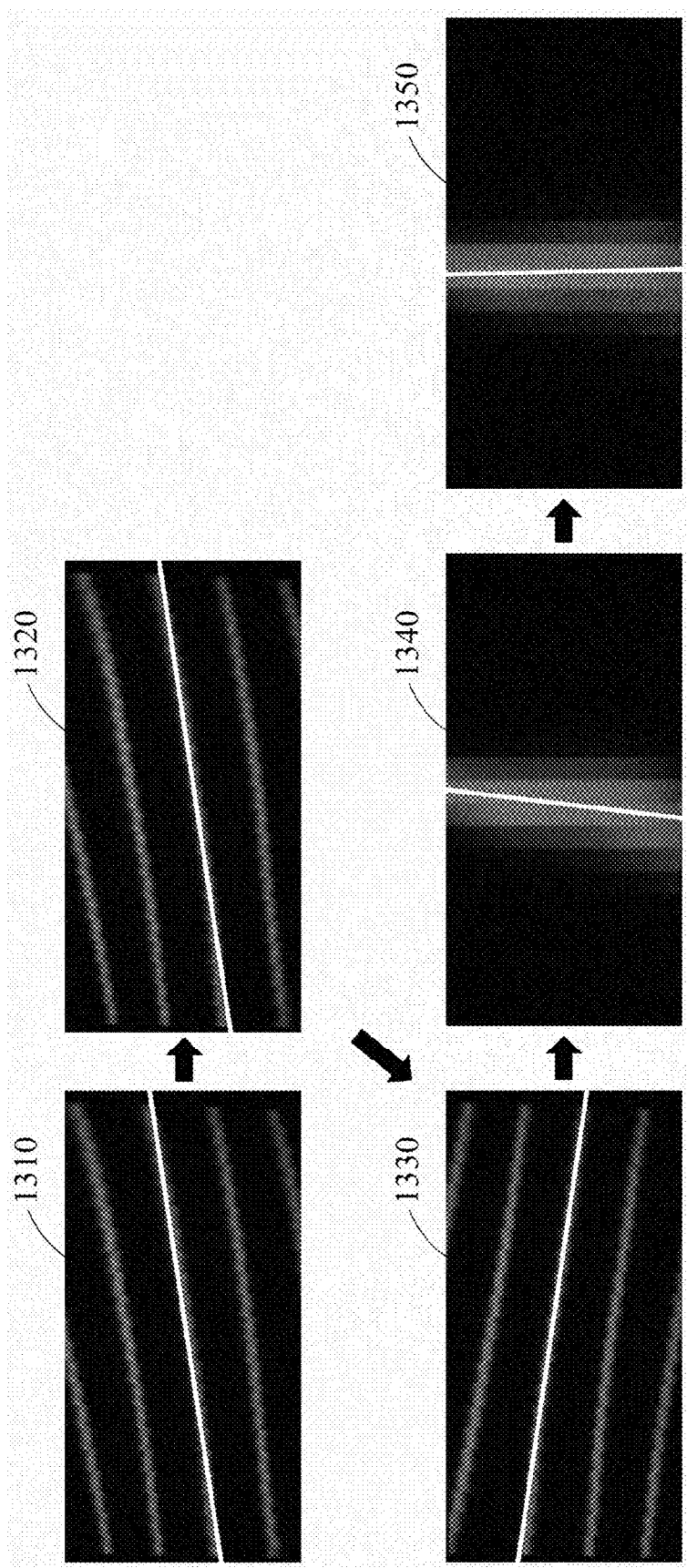
FIG. 13 is a diagram illustrating a process of changing a second captured image in a second calibration process according to an exemplary embodiment.

FIG. 13 is a diagram illustrating a changing process of a second captured image in a second calibration process according to an exemplary embodiment. Referring to FIG. 13, a second captured image 1310 through a second captured image 1340 may be acquired by adjusting a slanted angle parameter. Since a second linear pattern represented in the second captured image 1310 includes a plurality of lines, an actual value of the slanted angle parameter may be obtained using Equation 4. The obtained actual value of the slanted angle parameter may be applied to change the second captured image 1330 to the second captured image 1340. The slanted angle parameter and a start position parameter may be adjusted in the second captured image 1340, so that the second captured image 1340 is changed to the second captured image 1350. When it is verified that a gradient of a reference line of a second linear pattern is less than a threshold of a second condition in the second captured image 1350, calibration of the slanted angle parameter may be terminated. Also, a position of the reference line of the second linear pattern is within a range of the second condition in the second captured image 1350 and thus, calibration of the start position parameter may be terminated.

Figure 14:
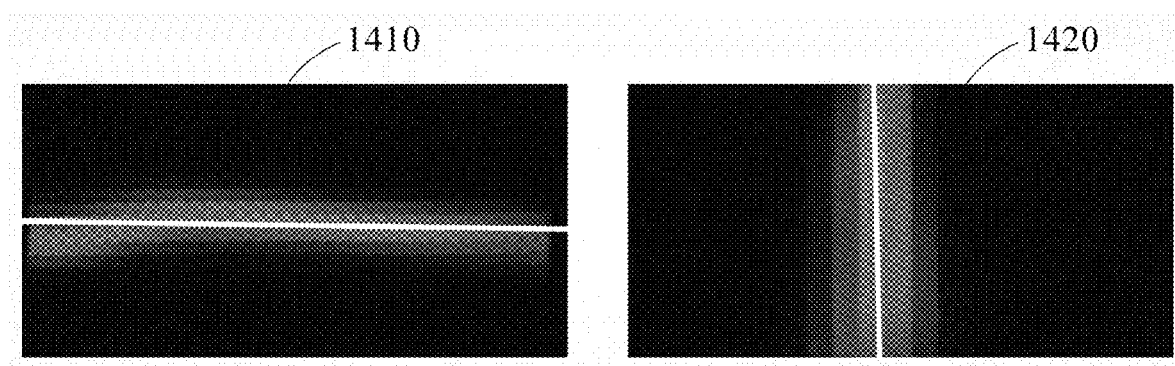
FIG. 14 is a diagram illustrating a first captured image and a second captured image on which calibration has been completed according to an exemplary embodiment.

FIG. 14 is a diagram illustrating a first captured image and a second captured image on which calibration has been completed according to an exemplary embodiment. A first captured image 1410 and a second captured image 1420 may be acquired in a state in which calibration, as described in FIGS. 12 and 13, has been completed. A first linear pattern of the first captured image 1410 may be substantially horizontal and substantially located on a vertical center. A second linear pattern of the second captured image 1420 may be substantially vertical and substantially located on a horizontal center, within the bounds of the desired thresholds and ranges. Referring to FIG. 14 and Equation 1, $P_{ACTUAL}$ may be equal to $P_{LFR}$ since $P_H$ is infinite in the first captured image 1410. Referring to FIG. 14 and Equation 3 $\theta_{ACTUAL}$ may be equal to $\theta_{LFR}$ since $P_V$ is infinite in the second captured image 1420.

Figure 15:
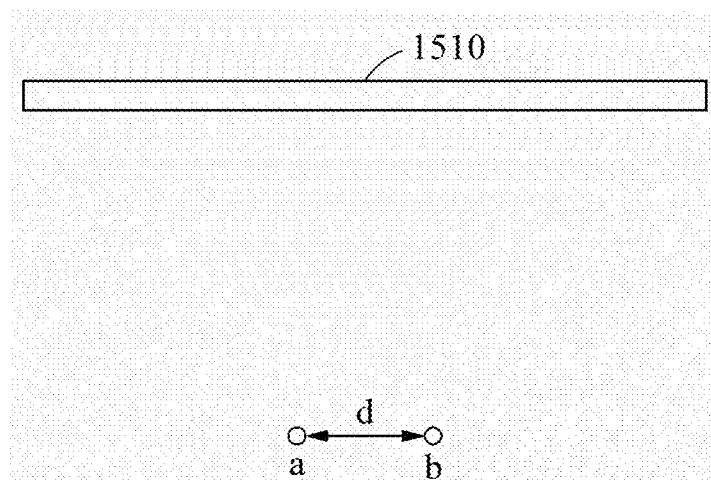
FIG. 15 is a diagram illustrating a process of adjusting a gap parameter according to an exemplary embodiment.

FIG. 15 is a diagram illustrating a process of adjusting a gap parameter according to an exemplary embodiment. FIG. 15 illustrates a 3D display apparatus 1510, a first location a of a camera, a second location b of the camera, and a distance d between the first location a and the second location b. In the foregoing description, a pitch parameter, a slanted angle parameter, and a start position parameter may be calibrated when a camera is in a stationary state. Referring to FIG. 15, a gap parameter may be calibrated by capturing the 3D display apparatus 1510 from different locations.

In the first location a, a pitch parameter, a slanted angle parameter, and a start position parameter may be calibrated through the aforementioned first and second calibration processes. For brevity of description, the pitch parameter, the slanted angle parameter, and the start position parameter may also be referred to as a third parameter set. The 3D display apparatus 1510 may render a pattern image of a reference view such that the pattern image is apparent from the first location a. The camera may capture the 3D display apparatus 1510 from the first location a. The calibration apparatus may perform the calibration of the third parameter set associated with the first location a based on a captured image.

The 3D display apparatus 1510 may render a pattern image of a reference view such that the pattern image is apparent from the second location b. The camera may capture the 3D display apparatus 1510 from the second location b. For example, the distance d may correspond to an inter-pupil distance. When the calibration of the gap parameter is completed, the calibration of the third parameter set may be completed in the first location a and thus, a crosstalk may not occur in the first location a and the second location b. When the crosstalk occurs in the second location b, although the calibration of the third parameter set may have been completed in the first location a, the calibration of the gap parameter may need to be performed. In this example, the calibration apparatus may adjust the gap parameter to perform the calibration of the gap parameter. For example, the calibration apparatus may verify whether the crosstalk occurs in the second location b while increasing or decreasing the gap parameter. When the crosstalk no longer occurs in the second location b, the calibration apparatus may terminate the calibration of the gap parameter.

Figure 16:
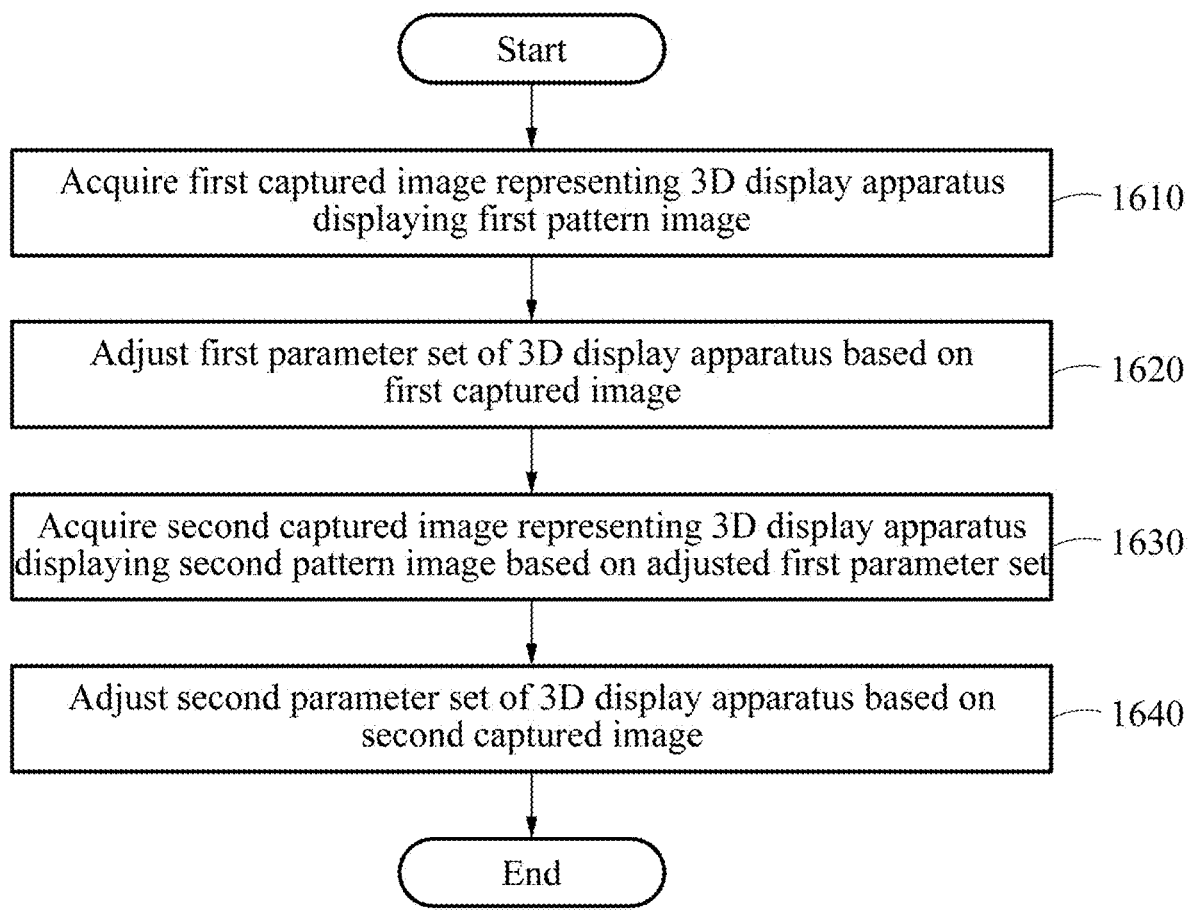
FIG. 16 is a flowchart illustrating a calibration method according to an exemplary embodiment.

FIG. 16 is a flowchart illustrating a calibration method according to an exemplary embodiment. Referring to FIG. 16, in operation 1610, a calibration apparatus may acquire a first captured image representing a 3D display apparatus displaying a first pattern image. In operation 1620, the calibration apparatus may adjust a first parameter set of the 3D display apparatus based on the first captured image. In operation 1630, the calibration apparatus may acquire a second captured image representing the 3D display apparatus displaying a second pattern image based on the adjusted first parameter set. In operation 1640, the calibration apparatus may adjust a second parameter set of the 3D display apparatus based on the second captured image. The description of FIGS. 1 through 15 may also be applied to the calibration method of FIG. 16.

Figure 17:
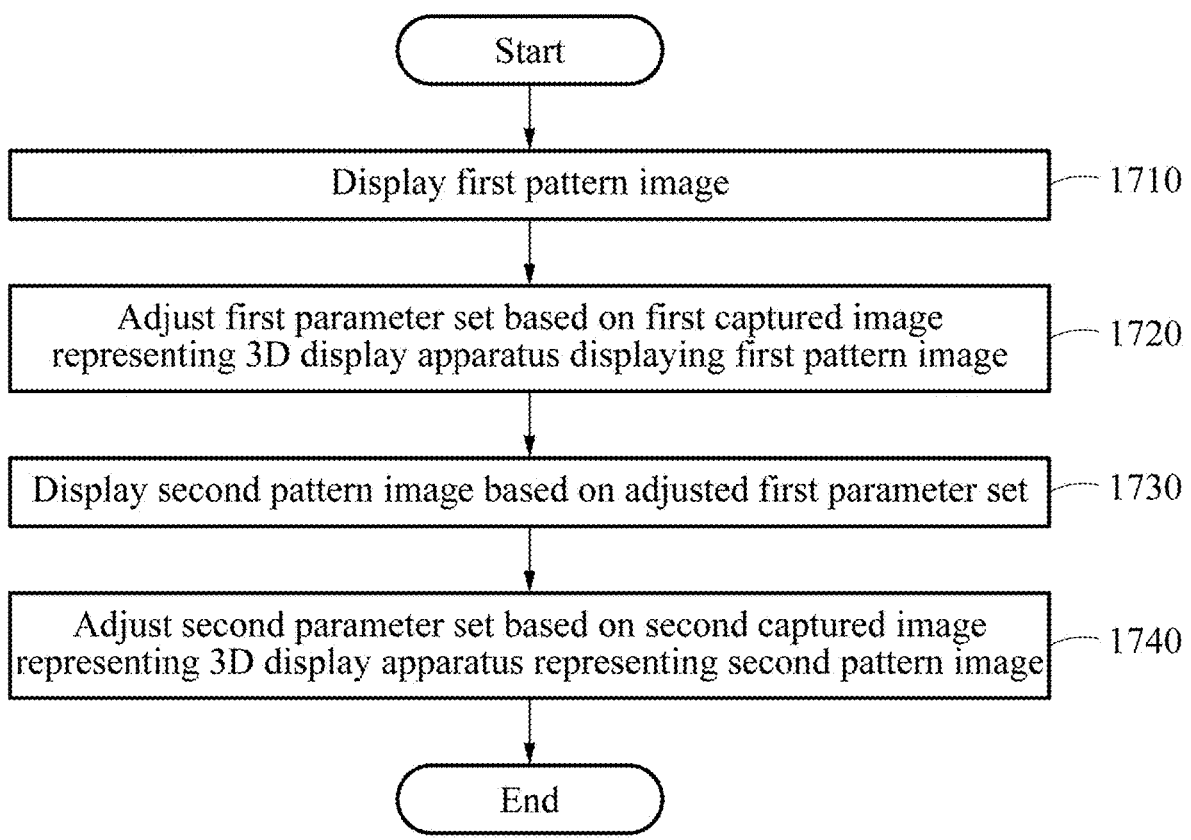
FIG. 17 is a flowchart illustrating an operating method of a display apparatus according to an exemplary embodiment.

FIG. 17 is a flowchart illustrating an operating method of a display apparatus according to an exemplary embodiment. Referring to FIG. 17, in operation 1710, a 3D display apparatus may display a first pattern image. In operation 1720, the 3D display apparatus may adjust a first parameter set based on a first captured image representing the 3D display apparatus displaying the first pattern image. In operation 1730, the 3D display apparatus may display a second pattern image based on the adjusted first parameter set. In operation 1740, the 3D display apparatus may adjust a second parameter set based on a second captured image representing the 3D display apparatus representing the second pattern image. The description of FIGS. 1 through 16 may also be applied to the operating method of FIG. 17.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, instructions, or some combination thereof, to independently or collectively instruct and/or configure the processing device to operate as desired, thereby transforming the processing device into a special purpose processor. Software and data may be embodied in any type of non-transitory machine, component, physical equipment, or computer storage medium or device. The software also may be distributed over network coupled computer systems so that the software is stored and executed in a distributed fashion. The software and data may be stored by one or more non-transitory computer readable recording mediums.

The methods according to the above-described exemplary embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of exemplary embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of exemplary embodiments have been described above. Nevertheless, it should be understood that various modifications may be made to these exemplary embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A calibration method comprising:
   acquiring a first captured image of a three-dimensional (3D) display apparatus displaying a first pattern image;
   adjusting a first parameter set of the 3D display apparatus based on the first captured image;
   acquiring a second captured image of the 3D display apparatus displaying a second pattern image based on the adjusted first parameter set; and
   adjusting a second parameter set of the 3D display apparatus based on the second captured image,
   wherein the first pattern image is generated based on a plurality of first source images respectively corresponding to a plurality of viewpoints, and
   the plurality of first source images each comprise a horizontal line at a position based on the respective corresponding plurality of viewpoints.

2. The calibration method of claim 1, wherein
   the second pattern image is generated based on a plurality of second source images respectively corresponding to a plurality of viewpoints, and
   the plurality of second source images each comprise a vertical line at a position based the respective corresponding viewpoints.

3. The calibration method of claim 1, further comprising:
   repeating the acquiring the first captured image and the adjusting the first parameter set, until a first condition is satisfied.

4. The calibration method of claim 3, wherein the first condition includes a gradient of a linear pattern appearing in the first captured image being less than a first threshold and a reference line of the linear pattern being located within a first range.

5. The calibration method of claim 1,
   when a linear pattern represented in the first captured image includes a single line, the adjusting the first parameter set comprises:
   measuring a gradient of the single line;
   adjusting a pitch parameter by a first value; and
   adjusting the pitch parameter by a second value based on a gradient change of the single line changing in response to the pitch parameter being adjusted by the first value.

6. The calibration method of claim 1,
   when a linear pattern appearing in the first captured image includes a plurality of lines, the adjusting of the first parameter set comprises:
   detecting a secondary linear pattern represented by the plurality of lines;
   determining an actual value of a pitch parameter based on a current value of the pitch parameter and a pitch of the secondary linear pattern; and
   adjusting the pitch parameter based on the determined actual value.

7. The calibration method of claim 1, wherein the first parameter set further includes a start position parameter indicating a relative position between a 3D conversion device and a display panel in the 3D display apparatus, and
   the adjusting the first parameter set comprises:
   measuring a position of a reference line of a linear pattern appearing in the first captured image;
   adjusting the start position parameter by a first value; and
   adjusting the start position parameter by a second value based on a positional change of the reference line changing in response to the start position parameter being adjusted by the first value.

8. The calibration method of claim 3, further comprising:
   repeating the acquiring the second captured image and the adjusting the second parameter set, until a second condition is satisfied.

9. The calibration method of claim 8, wherein the second condition includes a gradient of a linear pattern appearing in the second captured image being less than a second threshold and a reference line of the linear pattern being located within a second range.

10. The calibration method of claim 1,
    when a linear pattern represented in the second captured image includes a single line, the adjusting the second parameter set comprises:
    measuring a gradient of the single line;
    adjusting a slanted angle parameter by a first value; and
    adjusting the slanted angle parameter by a second value based on a gradient change of the single line changing in response to the slanted angle parameter being adjusted by the first value.

11. The calibration method of claim 6,
    when a linear pattern appearing in the second captured image includes a plurality of lines, the adjusting of the second parameter set comprises:
    detecting a secondary linear pattern represented by the plurality of lines;
    determining an actual value of a slanted angle parameter based on a current value of the slanted angle parameter and a pitch of the secondary linear pattern; and
    adjusting the slanted angle parameter based on the determined actual value.

12. The calibration method of claim 11, wherein the adjusting the slanted angle parameter comprises:
    adjusting the slanted angle parameter based on a pitch parameter included in the adjusted first parameter set, the pitch parameter that indicates a horizontal period of a unit element of a 3D conversion device in the 3D display apparatus.

13. The calibration method of claim 1, further comprising:
    acquiring a third captured image of the 3D display apparatus displaying a warped image; and
    determining a warping parameter for warping the first captured image and the second captured image based on the third captured image.

14. The calibration method of claim 13, wherein the acquiring the first captured image comprises warping the first captured image based on the warping parameter, and the acquiring the second captured image comprises warping the second captured image based on the warping parameter.

\* \* \* \* \*